US011532235B2

(12) United States Patent
Holder et al.

(10) Patent No.: US 11,532,235 B2
(45) Date of Patent: Dec. 20, 2022

(54) SYSTEMS AND METHODS FOR PROVIDING DEVIATION ASSISTANCE ON AN INTEGRATED FLIGHT MANAGEMENT DISPLAY

(71) Applicant: HONEYWELL INTERNATIONAL INC., Morris Plains, NJ (US)

(72) Inventors: Barbara Holder, Deer Valley, AZ (US); Stephen Whitlow, St. Louis Park, MN (US); Christopher Heine, Mesa, AZ (US); Steven Crouch, Mesa, AZ (US); Kelsey Keberle, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 226 days.

(21) Appl. No.: 16/598,026

(22) Filed: Oct. 10, 2019

(65) Prior Publication Data
US 2020/0168104 A1 May 28, 2020

Related U.S. Application Data

(60) Provisional application No. 62/772,040, filed on Nov. 27, 2018.

(51) Int. Cl.
*G08G 5/00* (2006.01)
*B64D 45/00* (2006.01)
(Continued)

(52) U.S. Cl.
CPC ........... *G08G 5/0039* (2013.01); *B64D 45/00* (2013.01); *G01C 21/20* (2013.01); *G06F 3/0482* (2013.01);
(Continued)

(58) Field of Classification Search
CPC .. G08G 5/0039; G08G 5/0013; G08G 5/0021; G08G 5/0026; G08G 5/0056;
(Continued)

(56) References Cited

U.S. PATENT DOCUMENTS 6,867,711 B1  3/2005 Langer
7,493,196 B2  2/2009 Caillaud et al.
(Continued)

FOREIGN PATENT DOCUMENTS

CN  109070997 A  * 12/2018  ............... B25J 11/00
CN  109528157 A  *  3/2019  ........... A61B 5/0015
(Continued)

*Primary Examiner* — Hunter B Lonsberry
*Assistant Examiner* — Jay Khandpur
(74) *Attorney, Agent, or Firm* — Lorenz & Kopf, LLP

(57) ABSTRACT

A flight deck system for providing task management assistance in managing the flight path to the flight crew is provided. The system is configured to: mine flight plan data for a current flight plan, navigational data, and vertical situation display (VSD) data; obtain notification data items originating from onboard avionics systems and systems external to the aircraft that indicate upcoming conditions that will affect the current flight plan; automatically analyze the mined flight plan data and the notification data items to identify a sensed deviation condition; automatically identify an aircraft-related deviation condition from an aircraft failure event; receive flight crew notification of a non-sensed deviation condition; automatically generate a plurality of flight plan deviation options to accommodate a sensed deviation condition, an aircraft-related deviation condition, or a non-sensed deviation condition; and present graphical elements representative of the flight plan deviation options to the flight crew on an integrated interactive graphical user interface.

20 Claims, 12 Drawing Sheets

(51) Int. Cl.
    *G01C 21/20* (2006.01)
    *G06F 3/0482* (2013.01)
    *G06F 3/04815* (2022.01)

(52) U.S. Cl.
    CPC ......... *G08G 5/0013* (2013.01); *G08G 5/0021* (2013.01); *G08G 5/0026* (2013.01); *G08G 5/0056* (2013.01); *B64D 2045/0075* (2013.01); *B64D 2045/0085* (2013.01); *G06F 3/04815* (2013.01)

(58) Field of Classification Search
    CPC ............ B64D 45/00; B64D 2045/0075; B64D 2045/0085; G01C 21/20; G06F 3/0482; G06F 3/04815
    See application file for complete search history.

(56) References Cited

U.S. PATENT DOCUMENTS

| | | | |
|---|---|---|---|
| 7,499,771 B2 | 3/2009 | Caillaud | |
| 7,765,061 B1 | 7/2010 | Barber et al. | |
| 8,094,188 B1* | 1/2012 | Yum | G01C 23/005 |
| | | | 348/113 |
| 8,521,340 B2 | 8/2013 | Coulmeau | |
| 9,830,829 B1* | 11/2017 | Doyen | G07C 5/008 |
| 10,180,995 B2* | 1/2019 | Jones | G05B 23/0251 |
| 10,339,817 B1* | 7/2019 | McGaughy | G08G 5/0021 |
| 2003/0064704 A1* | 4/2003 | Purpura | H04B 7/18508 |
| | | | 455/12.1 |
| 2012/0221375 A1* | 8/2012 | Tillotson | G06Q 10/06 |
| | | | 705/325 |
| 2013/0268878 A1 | 10/2013 | Le Roux et al. | |
| 2014/0005861 A1* | 1/2014 | Mere | G08G 5/0039 |
| | | | 701/3 |
| 2014/0309821 A1 | 10/2014 | Poux | |
| 2015/0355832 A1 | 12/2015 | Dostal et al. | |
| 2016/0041305 A1 | 2/2016 | Stulken et al. | |
| 2016/0093217 A1 | 3/2016 | Hale et al. | |
| 2016/0093222 A1* | 3/2016 | Hale | G08G 5/0021 |
| | | | 701/120 |
| 2019/0012752 A1 | 1/2019 | Rockafellow | |
| 2019/0080615 A1* | 3/2019 | Small | G08G 5/003 |
| 2019/0227558 A1 | 7/2019 | Lampazzi | |
| 2020/0150689 A1* | 5/2020 | Khatwa | G08G 5/0021 |

FOREIGN PATENT DOCUMENTS

| | | |
|---|---|---|
| EP | 2790168 A2 | 10/2014 |
| EP | 2985748 A1 | 2/2016 |

\* cited by examiner

SYSTEMS AND METHODS FOR PROVIDING DEVIATION ASSISTANCE ON AN INTEGRATED FLIGHT MANAGEMENT DISPLAY

CROSS-REFERENCE TO RELATED APPLICATION

This application claims priority to U.S. Provisional Application No. 62/772,040 filed Nov. 27, 2018. This application incorporates the prior application into the present application by reference.

TECHNICAL FIELD

Embodiments of the subject matter described herein relate generally to interactive aircraft display functionality. More particularly, embodiments of the subject matter relate to time-based, integrated aircraft display functionality that enables user interaction with and awareness of multiple data sources from a display onboard an aircraft.

BACKGROUND

The flight crew of modern, highly-automated aircraft are tasked with maintaining awareness of many flight critical parameters. Pilot workload is often high, requiring the performance of multiple simultaneous tasks. The flight crew uses several systems onboard an aircraft and may be required to direct their gaze in multiple directions to complete necessary tasks, obtain required information, and maintain safe and effective operation of the aircraft. Directing the gaze of a single pilot toward one particular system has an opportunity cost in terms of information processing in flight operations, an inability to attend and glean flight critical information from other displays or instrumentation. Currently, the management of information, tasks, time, and flight path are all performed by the skill of two pilots in most flight operations, and a significant reduction in pilot workload is needed to enable single pilot operations, an emerging industry interest given advances in automation and changes in pilot demographics and availability.

Hence, it is desirable to reduce pilot workload and/or to increase efficiency of pilot information processing and task completion. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A flight deck system for providing task management assistance in managing the flight path to the flight crew is provided. The system comprises one or more processors configured by programming instructions on non-transient computer readable media. The system is configured to: mine flight plan data for a current flight plan, navigational data, and vertical situation display (VSD) data from one or more aircraft systems; obtain notification data items originating from onboard avionics systems and from systems external to onboard avionics systems that indicate upcoming conditions that will affect the current flight plan; automatically analyze the mined flight plan data and the notification data items to identify a sensed deviation condition; automatically identify an aircraft-related deviation condition from an aircraft failure event; receive flight crew notification of a non-sensed deviation condition; automatically determine one or more modifications to the current flight plan to generate a plurality of flight plan deviation options to accommodate a sensed deviation condition, an aircraft-related deviation condition, or a non-sensed deviation condition; and present graphical elements representative of the flight plan deviation options to the flight crew on an integrated interactive graphical user interface (GUI) comprising a timeline GUI, a map GUI, and a VSD GUI displayed on an aircraft display.

A method in a flight deck system for providing task management assistance in managing the flight path to the flight crew is provided. The method comprises: mining flight plan data for a current flight plan, navigational data, and vertical situation display (VSD) data from one or more aircraft systems; obtaining notification data items originating from onboard avionics systems and from systems external to onboard avionics systems that indicate upcoming conditions that will affect the current flight plan; automatically analyzing the mined flight plan data and the notification data items to identify a sensed deviation condition when a sensed deviation condition exists; automatically identifying an aircraft-related deviation condition from an aircraft failure event when an aircraft failure event exists; receiving flight crew notification of a non-sensed deviation condition when a non-sensed deviation condition exists; automatically determining one or more modifications to the current flight plan to generate a plurality of flight plan deviation options to accommodate a sensed deviation condition, an aircraft-related deviation condition, or a non-sensed deviation condition; and presenting graphical elements representative of the flight plan deviation options to the flight crew on an integrated interactive graphical user interface (GUI) comprising a timeline GUI, a map GUI, and a VSD GUI displayed on an aircraft display.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
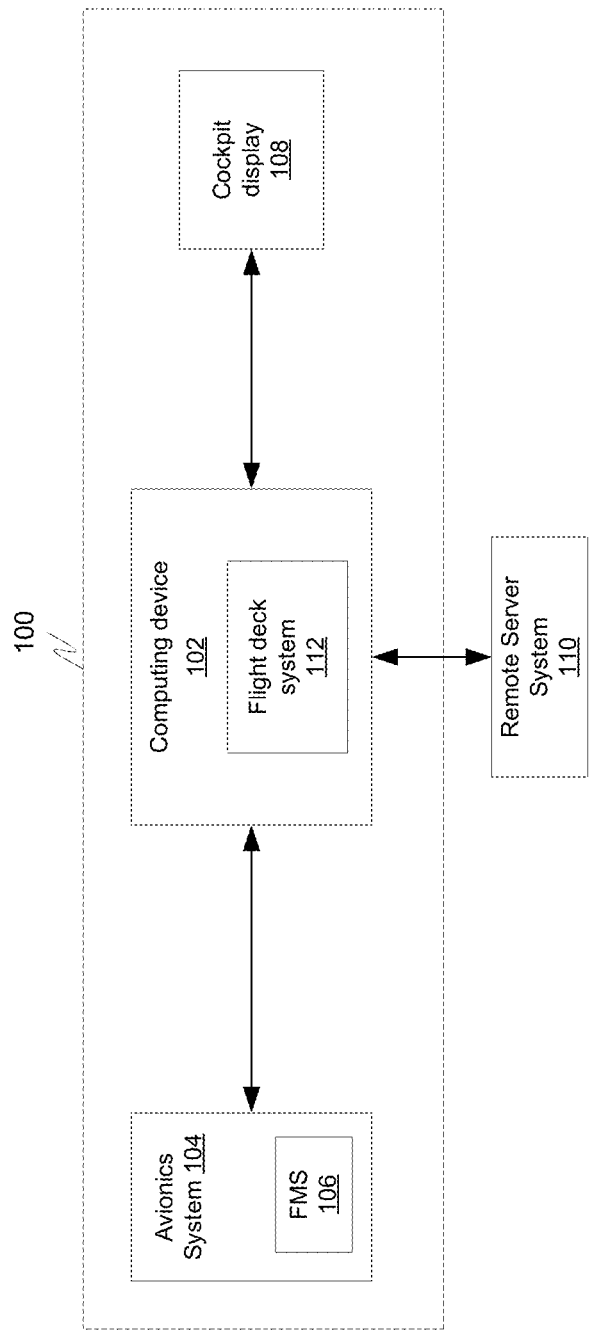
FIG. 1 is a diagram of an example system onboard an aircraft for providing integrative interactive display data for flight planning and aircraft onboard interactions to streamline flight crew workload, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for an integrated pilot workflow management system. The integrated pilot workflow management system can reduce flight crew workload associated with managing information, operational tasks, time, and flight path management. A significant reduction in flight crew workload can help enable single pilot operations and the system can contribute to workload reduction by presenting tasks and information in the proper context, timing, and sequence.

The described apparatus, systems, techniques and articles can support the flight crew by acquiring information, integrating the acquired information into a workflow, and presenting the acquired information in a useful format. The described apparatus, systems, techniques and articles can access onboard data sources and offboard information that are filtered for the planned flight. The described apparatus, systems, techniques and articles can present notifications and alerts as they arise in the workflow, including updates relevant to the planned route of flight, destination and alternate airports. The described apparatus, systems, techniques and articles can support pilot workflow by sequencing tasks such as checklists, briefings, fuel tracking, notifications, and information in the context of the flight plan. The described apparatus, systems, techniques and articles may also allow the flight crew to annotate the flight plan with personalized notes and reminders.

The described apparatus, systems, techniques and articles can assist the flight crew with managing interruptions and distractions, tasks, information, and unexpected events. The described apparatus, systems, techniques and articles can support the flight crew when recovering from interruptions and distractions by keeping place in the tasking, issuing reminders to resume tasks when necessary, and enabling the flight crew to flexibly shift tasks as needed. The described apparatus, systems, techniques and articles can provide a visual timeline that, in addition to providing a waypoint list, can list operational tasks that may include: icons for accessing normal checklists; icons for accessing phase of flight transition briefings; icons for accessing SPO (single pilot operation) return to duty situational awareness briefing; aircraft configuration change points; altitude change points; operational constraints (RTA, altitude, speed); current and projected aircraft energy and trajectory; position reporting points; ATC communications; and FIR boundaries.

The described apparatus, systems, techniques and articles can allow the flight crew to interact via multi-modal interaction (e.g., touch, speech, cursor). The described apparatus, systems, techniques and articles can use natural language speech to enable the flight crew to issue simple commands. The described apparatus, systems, techniques and articles may use FMS generated flight plan data to build a visual way point list from the computed flight plan and build a workflow manager where information, tasks, and functions are enabled in the context of the flight plan. The described apparatus, systems, techniques and articles can present normal checklists at the time and flight phase in which they are needed and allow the flight crew to access them via icons on the timeline. The described apparatus, systems, techniques and articles can allow operational information such as ATIS, significant weather, and NOTAMS to be retrieved from connected sources and be represented on the timeline at the time needed by the flight crew for review. The flight crew may access difficult to find information regarding the flight directly on the timeline, such as remaining fuel and maximum achievable altitude. The described apparatus, systems, techniques and articles can present direct to, lateral, and vertical flight plan deviations on a navigation display as a visual layer on top of navigation data.

FIG. 1 is a diagram of an example system 100 onboard an aircraft for providing integrative interactive display data for flight planning and aircraft onboard interactions to streamline flight crew workload. The system 100 operates to provide a user-friendly and central display presentation of a time-based flight plan, user-selectable icons that provide time-based notifications during performance of a mission, a combination of display aspects that include an aircraft flight plan timeline, a map display from which a user may toggle between three-dimensional (3D) views and bird's-eye views, and deviation assistance capabilities that identify conditions requiring an aircraft to divert and provide candidate flight plan modifications from which a new flight plan may be selected or automatically generated. The example system 100 includes a computing device 102 that communicates with one or more avionics systems 104 onboard an aircraft (including a Flight Management System (FMS) 106, a display device 108, and at least one remote server system 110. In practice, certain embodiments of the system 100 may include additional or alternative elements and components, as desired for the particular application.

The example computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to determine and present flight data analysis, including flight planning, flight plan deviation analysis, flight plan timeline data, flight plan notification data, navigation data, map data, aviation checklist data, weather data, or the like.

The computing device 102 is configured to implement a flight deck system 112 for providing navigational guidance to the flight crew. The example flight deck system 112 comprises one or more processors configured by programming instructions on non-transient computer readable media. The example flight deck system 112 is configured to establish communications with the FMS 106 to obtain FMS-based flight planning data for use via the cockpit display 108.

The aircraft 106 may be any aviation vehicle for which the integrated interactive display functionality is relevant and applicable during flight planning and completion of a flight route. The aircraft 106 may be implemented as an airplane, helicopter, spacecraft, hovercraft, or the like. The one or more avionics systems 108 may include a Flight Management System (FMS), Automatic Dependent Surveillance-Broadcast (ADS-B) devices, Terrain Awareness and Warning System (TAWS) devices, navigation devices, weather radar, brake systems, or the like. Data obtained from the one or more avionics systems 108 may include, without limitation: flight plan data, current and updated flight parameter data, weather data, airport data, runway analysis data, aircraft performance data, navigation data, map data, or the like.

The server system 110 may include any number of application servers, and each server may be implemented using any suitable computer. In some embodiments, the server system 110 includes one or more dedicated computers. In some embodiments, the server system 110 includes one or more computers carrying out other functionality in addition to server operations. Each server of the server system 110 may be maintained by any applicable business or organization (e.g., government and regulatory agencies, universities and other research-based organizations, airlines, aviation safety monitoring organizations, safety data aggregators, weather data aggregators, traffic data aggregators), and each server of the server system 110 may store and provide any type of data used to perform flight data analysis. Such data may include, without limitation: weather data (e.g., wind speed, cloud cover, visibility, precipitation, temperature); airport and air traffic control (ATC) data (e.g., airport, runway length, ATIS, airport arrival rate, arrival/departure taxi time); Automatic Terminal Information Service (ATIS) data (e.g., current weather data, active runways, available approaches, Notices to Airmen (NOTAMs)); aircraft and flight-specific data (e.g., flight state data), flight plan data, aircraft condition data, aircraft specifications, NOTAMs). Exemplary embodiments of the server system 110 may include weather services, operations and performance data services (e.g., the Federal Aviation Administration System Wide Information Management, archived data, and/or current data), or the like.

During operation, the flight deck system 112 communicates with an onboard FMS to obtain relevant flight planning and timing data associated with the current flight plan. The flight deck system 112 also obtains connected data associated with airport data, runway data, navigation data, map data, weather data, waypoint data, aviation checklist data, aircraft data, aircraft weight data, aircraft fuel data, timing data, distance data, airport facilities data, emergency services data, legality data, flight plan deviation data, and the like, from the one or more remote servers of the server system 110. The flight deck system 112 then uses the relevant data to: (1) present an interactive timeline including a waypoint list and corresponding timing data for the aircraft to reach each waypoint, and including user-selectable icons representing alerts/notifications, user-configured reminders, and/or checklists associated with particular times and corresponding locations on the timeline; (2) present a navigation/map display including color-coded graphical elements to emphasize an active segment of a current flight path and toggle-functionality for toggling between a three-dimensional graphical display of a current location of the aircraft and current surroundings (as associated with the current flight plan) and a top-down, "bird's eye view" graphical display of the current location of the aircraft and current surroundings; (3) present smart checklist functionality including guiding flight crew members through checklist tasks/items based on previously submitted user input, wherein each checklist input item indicates a next item for presentation from an aggregate set of checklist data that includes a plurality of checklists and each of the plurality of checklists includes a plurality of checklist tasks, and also presenting non-normal checklist items as part of the interactive smart checklist functionality; (4) flight plan deviation assistant functionality that includes identifying deviation conditions (e.g., weather causing a flight plan deviation, airport closures, runway closures, special airspace, or the like), determining modifications to the flight plan that can be implemented to accommodate a deviation, and activating a new flight plan to accommodate the deviation; and (5) presenting an interactive integrated display that includes the interactive timeline display with all associated functionality, the navigation/map display and all associated functionality, a Vertical Situation Display (VSD) with all associated functionality, and other user interactive features, as described herein.

The example flight deck system is configured to: mine flight plan data, navigational data, and vertical situation display (VSD) data from one or more aircraft systems, the mined flight plan data including a plurality of waypoints and other course data items for a current flight plan, the mined navigational data comprising aircraft location, speed, and heading data, the mined VSD data comprising a vertical profile of the aircraft for the current flight plan, an altitude reference, terrain data, and glideslope data; obtain notification data items originating from systems external to the aircraft that indicate upcoming conditions that will affect the aircraft flight plan and a location at which the upcoming conditions will affect the aircraft flight plan; determine an estimated flight time to reach each of the plurality of waypoints, course data items, and the upcoming conditions; cause an integrated interactive graphical user interface (GUI) comprising a timeline GUI, a map GUI, and a VSD GUI to be displayed on an aircraft display, wherein the timeline GUI is configured to display a timeline with a time scale, waypoint graphical elements representative of the waypoints, course data item graphical elements representative of the other course data items, and notification data item graphical elements representative of the upcoming conditions, and wherein when displayed each waypoint graphical element, course data item graphical element and notification data item graphical element is positioned on the timeline at a position that corresponds with the estimated time for the aircraft to reach the graphical element; automatically analyze the mined flight plan data and the notification data items to determine if deviation from a planned event in the flight plan is suggested (e.g., not enough fuel, weather requires deviation, diversion required); and provide a notification of the suggested deviation from a planned event when deviation is suggested.

Figure 2:
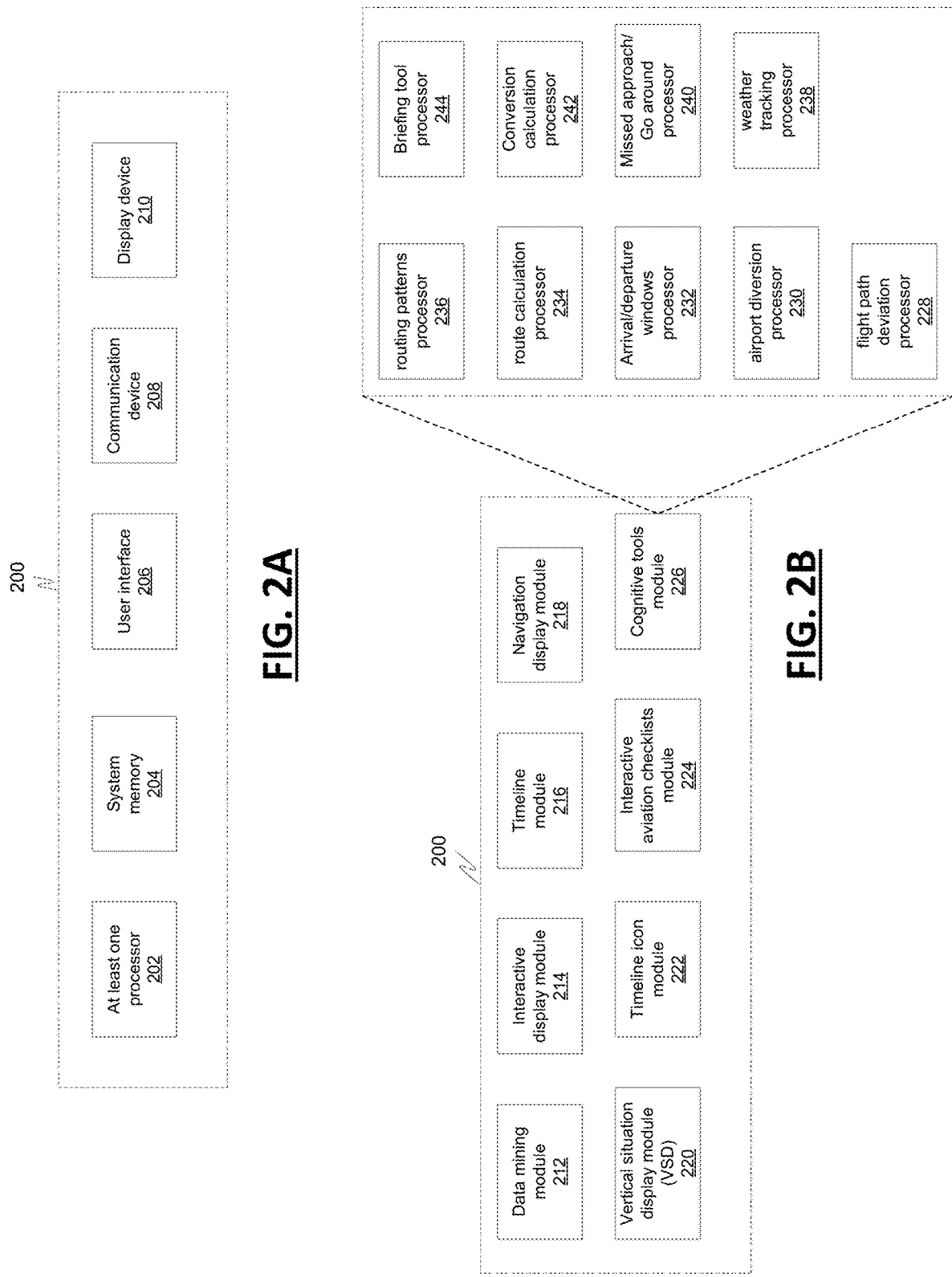
FIG. 2A is a block diagram of example hardware components in an example computer system that may implement a flight deck system for providing task management assistance in managing the flight path to the flight crew, in accordance with some embodiments.
FIG. 2B is a functional block diagram of functional components of the example computer system that are implemented via the example hardware components of FIG. 2A, in accordance with some embodiments.

FIG. 2A is a block diagram of example hardware components in an example computer system 200 that may implement a flight deck system for providing task management assistance in managing the flight path to the flight crew. The example functional components of the example computer system 200 include: at least one processor 202; system memory 204; a user interface 206; a communication device 208; and a display device 210.

The elements and features of the example computer system 200 of FIG. 2A may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 2A. Moreover, embodiments of the example computer system 200 may also include other elements, modules, and features that cooperate to support the desired functionality. For simplicity, FIG. 2A only depicts certain elements that relate to the interactive integrated display creation and use techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with the interactive integrated display, including flight planning, flight deviation options, flight plan timelines, flight plan waypoints, navigation data, map data, VSD data, notification and alerting data, aviation checklist data, or the like. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computer system 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computer system 200. For example, the user interface 206 could be manipulated by an operator to provide user input checklist completion data, to provide user-configured reminder data to initialize a user-configured reminder icon on the timeline display, and/or to provide user selections for flight plan deviation options presented via the map/navigation display, as described herein. Additionally, in certain embodiments, the user interface 206 may implement multi-modal functionality that includes voice data and/or speech data recognition, touch interaction, gesture interaction, and/or cursor interaction.

In certain embodiments, the user interface 206 may include or cooperate with various features to allow a user to interact with the computer system 200 via graphical elements rendered on a display element (e.g., the display device 210). Accordingly, the user interface 206 may initiate the creation, maintenance, and presentation of a graphical user interface (GUI) for the integrated interactive display or any one of the component parts of the integrated interactive display (e.g., a timeline graphical element, a map/navigational display graphical element, a vertical situation display (VSD) graphical element). In certain embodiments, the display device 210 implements touch-sensitive technology for purposes of interacting with the GUI. Thus, a user can manipulate the GUI by moving a cursor symbol rendered on the display device 210, or by physically interacting with the display device 210 itself for recognition and interpretation, via the user interface 206.

The communication device 208 is suitably configured to communicate data between the computer system 200 and one or more remote servers, one or more secondary computing devices, and one or more avionics systems onboard an aircraft. The communication device 208 may transmit and receive communications over a wireless local area network (WLAN), the Internet, a satellite uplink/downlink, a cellular network, a broadband network, a wide area network, or the like. Data received by the communication device 208 may include, without limitation: weather data, airport data, runway data, air traffic control (ATC) data, airport arrival delays, airport departure delays, "hold" notifications and/or holding patterns associated with particular waypoints, Automatic Terminal Information Service (ATIS) data (e.g., current weather data, active runways, available approaches, Notices to Airmen (NOTAMs)); aircraft and flight-specific data (e.g., flight state data, flight plan data, aircraft specifications, NOTAMs). Data provided by the communication device 208 may include, without limitation: flight plan clearance requests associated with flight plan deviation options, requests for external data accessible via remotely located servers, or the like.

The display device 210 is configured to display various icons, text, and/or graphical elements associated with the integrated interactive display, including graphical elements and text associated with flight planning, flight plan timing, notifications/alerts associated with flight plan and timing of the flight plan, aviation checklists for completion during the flight (including normal and non-normal "smart" checklists), and the like. In an exemplary embodiment, the display device 210 is communicatively coupled to the user interface 206 and at least one processor 202. The at least one processor 202, the user interface 206, and the display device 210 are cooperatively configured to display, render, or otherwise convey one or more graphical representations or images associated with the interactive integrated display and associated functionality on the display device 210, as described in greater detail below. In an exemplary embodiment, the display device 210 is realized as an electronic display configured to graphically present the integrated interactive display, as described herein. In some embodiments, the computer system 200 is an integrated computer system onboard an aircraft, and the display device 210 is located within a cockpit of the aircraft, and is thus implemented as an aircraft display. In other embodiments, the display device 210 is implemented as a display screen of a standalone, personal computing device (e.g., laptop computer, tablet computer). It will be appreciated that although the display device 210 may be implemented using a single display, certain embodiments may use additional displays (i.e., a plurality of displays) to accomplish the functionality of the display device 210 described herein.

FIG. 2B is a functional block diagram of functional components of the example computer system 200 that are implemented via the example hardware components of FIG. 2A. The functional components of the example computer system 200 includes a data mining module 212, an integrated interactive display module 214; a timeline module 216; a navigation display module 218; a vertical situation display (VSD) module 220; a timeline icon module 222; an interactive aviation checklists module 224, and a cognitive tools module 226.

The elements and features of the example computer system 200 of FIGS. 2A and 2B may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIGS. 2A and 2B. Moreover, embodiments of the example computer system 200 may also include other elements, modules, and features that cooperate to support the desired functionality. For simplicity, FIGS. 2A and 2B only depicts certain elements that relate to the interactive integrated display creation and use techniques described in more detail below.

The data mining module 212 comprises at least one processor configured by programming instructions on non-transient computer readable media. The data mining module 212 is configured to mine flight plan data, navigational data, and vertical situation display (VSD) data from one or more aircraft systems. The mined flight plan data may include a plurality of waypoints and other course data items for a current flight plan. The other course data items may include a plurality of a scheduled altitude change, scheduled speed change, a scheduled heading change, and an altitude, speed, or time restriction. The mined navigational data may include aircraft location, speed, and heading data. The mined VSD data may include a vertical profile of the aircraft for the current flight plan, an altitude reference, terrain data, and glideslope data. The data mining module 212 is also configured to obtain notification data items originating from systems external to avionics systems on the aircraft that indicate upcoming conditions that will affect the aircraft flight plan and a location at which the upcoming conditions will affect the aircraft flight plan.

The integrated interactive display module 214 comprises at least one processor configured by programming instructions on non-transient computer readable media and is configured to cause an integrated interactive graphical user interface (GUI) to be displayed on a single instrument or display system to allow the flight crew to view and access a single instrument or display system to interact with the computer system 200. In one example, the integrated interactive display module 214 is configured to cause the generation and display of an integrated interactive GUI comprising a timeline GUI, a map GUI, and a VSD GUI to be displayed on the aircraft display 210. In one example, the integrated interactive display module 214 is configured to cause the display of the timeline GUI as a first aspect of the integrated interactive GUI, the display of the the map GUI as a second aspect of the integrated interactive GUI, and the display of the VSD GUI as a third aspect of the integrated interactive GUI. In this example, the integrated interactive display module 214 is configured to position the first aspect adjacent to both the second aspect and the third aspect, position the second aspect adjacent to both the first aspect and the third aspect, and position the third aspect adjacent to both the first aspect and the second aspect, wherein the integrated interactive GUI comprises the adjacent aspects.

The timeline module 216 comprises at least one processor configured by programming instructions on non-transient computer readable media and is configured to generate a timeline GUI that includes a timeline graphical element, an aircraft graphical element, a plurality of waypoint graphical elements representative of waypoints for a current flight plan, course data item graphical elements representative of the other course data items, and notification data item graphical elements representative of upcoming conditions related to performance of the current flight plan. The plurality of waypoints may be retrieved from an avionics system such as an aircraft onboard Flight Management System (FMS). The other course data items may include a plurality of a scheduled altitude change, scheduled speed change, a scheduled heading change, and an altitude, speed, or time restriction.

The upcoming conditions may include alerts/notifications from connected sources (e.g., weather alerts), aviation checklists requiring completion at various times during the mission, and user-configured reminders at times identified by the user to allow a user to be reminded of specific items at the user's preferred reminder time. The notification data items may include one or more of an aviation electronic checklist, a weather alert, an ATC alert, a traffic alert, NOTAMS, aircraft equipment trouble alert, a flight crew configurable reminder, a hold reminder for a waypoint indicating a desire to hold at the waypoint, an airport change notice (e.g., closed runway, destination airport problem), special use airspace notice, departure delay notice, or arrival delay notice.

The timeline module 216 is further configured to correlate each of the plurality of waypoint graphical elements, course data item graphical elements, and notification data item graphical elements to a corresponding, calculated time value. The time value represents the time that the aircraft should take to reach the item represented by the graphical element. The timeline module 216 is configured to either calculate an estimated flight time to reach each of the plurality of waypoints, course data items, and the upcoming conditions and/or retrieve the information from another aircraft system (e.g., the time values for the waypoints may be calculated by the timeline module or calculated by, and obtained from, the FMS). To determine an estimated flight time, the timeline module 216 may be configured to determine an estimated flight time based on navigational data (e.g., current aircraft location, speed, heading).

When displayed each waypoint graphical element, course data item graphical element and notification data item graphical element is positioned on the timeline along with the estimated time for the aircraft to reach the item represented by the graphical element. Thus, the timeline module 216 is configured to provide a time-based visualization of the current flight plan, actions to be performed (or required for performance), and events occurring during the flight according to time values.

The notification data items may be selectable and when selected causes the display of additional information regarding the notification data item. For example, selection of a weather notification graphical element may cause the display of additional information regarding the weather event associated with the selected weather notification graphical element.

The timeline generated by the timeline module 216 may be a moving timeline that is systematically adjusted to show displayed waypoint graphical elements, course data item graphical elements, and notification data item graphical elements moving closer to the aircraft graphical element representative of the aircraft located at one end of the moving timeline.

The timeline GUI generated by the timeline module 216 may be configured to display adjacent to each displayed waypoint graphical element, course data item graphical element, and notification data item graphical element both the projected time to reach and the aircraft's distance from the location at which the item represented by the waypoint graphical element, course data item graphical element, or notification data item graphical element is relevant.

The navigation display module 218 comprises at least one processor configured by programming instructions on non-transient computer readable media and is configured to present map data, navigational data, aircraft location data, flight path data, and geographic location data via a graphical map display. The navigation display module 218 is configured to present a top-down, "bird's eye" viewpoint or a three-dimensional (3D) viewpoint, and is further configured to receive user selections to activate toggling between the top-down and 3D viewpoints, as desired by the user. The navigation display module 218 is also configured to provide flight plan deviation options, and to present graphical elements representative of the flight plan deviation options. Such flight plan deviation option graphical elements may be presented separately and alone on the interactive integrated display, or may be presented simultaneously with current flight plan graphical elements. In embodiments where the current flight plan graphical elements and the flight plan deviation option graphical elements are presented simultaneously, the navigation display module 218 uses distinguishing visual characteristics to allow the flight plan deviation options to visually stand-out and be different from and easily distinguishable by the flight crew when viewing both sets of graphical elements at the same time.

The vertical situation display (VSD) module 220 comprises at least one processor configured by programming instructions on non-transient computer readable media and is configured to present graphical elements and text associated with an aircraft onboard VSD, in an integrated manner such that the VSD display operates in conjunction with the graphical map display (provided by the navigation display module 218) to present a VSD-style view of the same data concurrently presented by the graphical map display using the top-down or 3-D viewpoint. Additionally, the VSD module 220 is configured to provide graphical elements representing weather conditions, flight plan deviation options, and other functionality.

The timeline icon module 222 comprises at least one processor configured by programming instructions on non-transient computer readable media and is configured to operate cooperatively with the timeline module 216 to provide one or more graphical icons applicable to the current flight plan. The icons may include, without limitation: official notifications and/or alerts based on external data and flight conditions (e.g., severe weather conditions, "hold" reminder data associated with a required holding pattern at a particular waypoint represented on the timeline, airport change data requiring a change to a planned destination or stopover airport, special-use airspace data, departure delay data, and arrival delay data). The timeline module 216 is also configured to present graphical icons representative of aviation checklists for completion at particular points in time during the flight, wherein the icon is positioned at the particular point in time appropriate for completion. The timeline icon module 222 is also configured to present graphical icons representative of user-configured reminders, which may be set by a user through the interactive integrated display, such that a reminder icon is presented on the timeline graphic and is positioned at the time on the timeline at which the user is to be reminded. Icons are configured for user-selection, wherein when selected additional data is presented to the user. As an example, a user may select a weather condition alert icon, and the interactive integrated display may respond to the user selection by presenting additional detail regarding the severe weather condition. In another example, a user may select a checklist icon, and the interactive integrated display may respond to the user selection by presenting additional detail regarding the checklist. Additionally, the interactive integrated display may open the appropriate aviation checklist via a communicatively coupled checklist interface onboard the aircraft. In another example, a user may select a user-configured reminder icon, and the interactive integrated display may respond to the user selection by presenting additional detail regarding the reminder, including any data that the user had previously entered and saved via the interactive integrated display interface.

The interactive aviation checklists module 224 comprises at least one processor configured by programming instructions on non-transient computer readable media and is configured to provide interactive checklist functionality via the integrated interactive display provided by the computer system 200. First, the interactive aviation checklists module 224 is configured to enable user access to aviation checklists via graphical icons (provided by the timeline icon module 222) presented by the timeline GUI (provided by the timeline module 216). In one example, the interactive aviation checklists module 224 may provide applicable checklist data directly from the interactive integrated display, when the user selects the user-selectable timeline graphical icon representing a checklist for completion at the particular time value at which the checklist graphical icon is displayed. In another example, the interactive aviation checklists module 224 may cause the appropriate checklist to open via a checklist display interface communicatively coupled to the computer system 200. This may be accomplished by the interactive aviation checklists module 224 transmitting a command or request to the onboard aviation checklist system to execute or otherwise open and enable user completion of the appropriate checklist via the aircraft onboard checklist system.

Second, the interactive aviation checklists module 224 is configured to provide user access to "smart" checklist functionality. The computing device accesses and uses the OEM's non-normal checklists, organizes them, and integrates them in a manner structured to support flight crew workflow. When a non-normal condition occurs, such as an engine failure, the computing device provides an alerting message, and the alerting message triggers a non-normal checklist. The smart checklist functionality, therefore, interacts with normal checklists when something breaks on the airplane or there is a non-normal condition that impacts a task the flight crew needs to perform, the operational capabilities of the airplane, or a normal checklist. The smart checklist functionality causes task changes to be represented on the timeline. The task changes may be represented by a change of color (e.g., red, amber) of the normal checklist icon on the timeline indicating that there has been a change to that checklist because of some problem. The smart checklist functionality causes task changes to address the failure. The smart checklist functionality retrieves OEM provided content and organizes the content for presentation to the flight crew. As an example, the computing device may obtain OEM provided content from an OEM quick reference handbook and merge the content with the normal checklist to modify the required workflow. The computing device accesses the OEM data and organizes it to make it simpler, so that it is easier for the flight crew to proceed through the checklist items from the aggregate sets of checklists. The computing device begins with a first line item, receives user input to indicate whether the flight crew has completed the actions in the line item, and the line item is then checked off as complete. And then as the checklist is completed, circumstances and appropriate next-items presented for completion can change based on previous input. Once a task (i.e., line item) is completed, depending on the selection to complete the task, two options are then presented in response to the completion. Depending on which checklist option was chosen, the data on the left side of the checklist changes, based on the user-entered checklist selection. Smart checklists can be accessed directly from an icon (i.e., graphical element) on the timeline user interface (UI). Smart checklists can guide the flight crew through multiple checklists, based on flight crew choices and selections. For example, when there are five checklists, the computing device will guide the flight crew through the five checklists in an integrated way.

The cognitive tools module 226 comprises at least one processor configured by programming instructions on non-transient computer readable media. The cognitive tools module 226 includes a flight path deviation processor 228 that is configured to automatically analyze the mined flight plan data and the notification data items to determine if deviation from the flight plan is suggested (e.g., not enough fuel, weather requires deviation, diversion required). The flight path deviation processor 228 is further configured to provide a notification of the suggested deviation when deviation is suggested. The flight path deviation processor 228 may be a rule-based system that compares options for lateral and vertical flight path deviations and presents the computed best options based on current aircraft performance. The flight path deviation processor 228 may be accessible directly from a link on the timeline GUI.

To analyze the mined flight plan data and the notification data items the flight path deviation processor 228 may be configured to analyze the mined flight plan data and the notification data items to identify a sensed deviation condition (e.g., a mission altering event) that due to time, fuel or safety considerations raises concerns regarding the current aircraft travel path and to identify one or more flight path deviation recommendation options for the aircraft to minimize impact of or avoid the mission altering event. The example flight path deviation processor 228 is also configured to automatically identify an aircraft-related deviation condition from an aircraft failure event. The example flight path deviation processor 228 is also configured to receive flight crew notification of a non-sensed deviation condition. The flight path deviation processor 228 is configured to automatically determine one or more modifications to the current flight plan to generate a plurality of flight plan deviation options to accommodate a sensed deviation condition, an aircraft-related deviation condition, and/or a non-sensed deviation condition. To automatically determine one or more modifications to the current flight plan to generate a plurality of flight plan deviation options, the flight deck system may be configured to incorporate operational limitations and checklist requirements in deviation planning.

A sensed deviation condition may include a weather condition along or approaching the flight path, an airport closure at a planned destination airport, a runway closure at a planned destination runway, an airspace restriction along the planned flight path that causes a desire for a flight plan deviation, and/or other conditions. An aircraft failure event may include a hydraulic failure, electrical system failure, engine failure, flight automation failure, and/or other failure. A non-sensed deviation condition may include an on-board medical emergency and/or other conditions.

The example flight path deviation processor 228 is configured to present graphical elements representative of the flight plan deviation options to the flight crew on an integrated interactive graphical user interface (GUI) comprising a timeline GUI, a map GUI, and a VSD GUI displayed on an aircraft display. The notification of the suggested deviation may be in the form of a selectable deviation notification graphical element displayed on the integrated interactive GUI. The selection of the selectable deviation notification graphical element may cause the display of one or more selectable deviation recommendation graphical elements, wherein each contains graphical data that is descriptive of a flight path deviation recommendation option. The selection of a selectable deviation recommendation graphical element may cause a preview of a flight path deviation recommendation option to be displayed on the map GUI and/or the VSD GUI.

The flight path deviation processor 228 may be configured to submit a flight path deviation recommendation option selected by the flight crew to ATC for approval. The flight path deviation processor 228 may be configured to provide a selectable activate graphical element for flight crew selection that when selected causes a selected flight path deviation recommendation option to be activated.

The cognitive tools module 226 further includes an airport diversion processor 230. The example airport diversion processor 230 is a rule-based system that compares options for diversions and presents the best airport options for diversion based on current aircraft performance, fuel, airport services, and runways, distance, or other pilot selectable criteria. The example airport diversion processor 230 may be made accessible directly from a link on the timeline GUI and from non-normal checklists that require landing as soon as practical.

The cognitive tools module 226 further includes an arrival/departure windows processor 232 configured to calculate arrival/departure windows at an airport due to limitations and weather. The example arrival/departure windows processor 232 is a rule based system that shows the current arrival/departure timing at the departure airport and destination airport given the current aircraft performance and weather conditions.

The cognitive tools module 226 further includes a route calculation processor 234 for computing the best alternate route based on a set of default criteria and/or pilot selectable criteria. The example route calculation processor 234 is a rule-based system that searches the airport database and airport information to match the criteria and presents options to the flight crew.

The cognitive tools module 226 further includes a routing patterns processor 236 for computing ATC/routing patterns along a planned route/destination. The example routing patterns processor 236 is a machine learning system that merges historical air traffic data with weather data and current traffic and ATC routing to show what the ATC is currently doing and to predict changes when there is a significant event such as weather or airport closure.

The cognitive tools module 226 further includes a weather tracking processor 238 for weather tracking along the route. The example tracking processor is configured to continuously monitor weather data to provide a notice to the flight crew when the ceiling at a destination is approaching minimums or is below minimums.

The cognitive tools module 226 further includes a missed approach/Go around processor 240. The example missed approach/Go around processor 240 is configured to automatically generate new procedures when an approach is missed and a go around is needed. The generated new procedures may be displayed on the timeline GUI, map GUI, and/or VSD GUI.

The cognitive tools module 226 further includes a conversion calculation processor 242 for converting different units, such as pounds to kilograms, feet to meters, kilometers to nautical miles, statute miles to nautical miles, and more. The example conversion calculator may be made available for use via the timeline GUI.

The cognitive tools module 226 further includes a briefing tool processor 244 for guiding the flight crew through briefing items for the next flight phase. The example briefing tool processor 244 is configured to display the briefing verbiage, procedure to be flown, and associated charts. For example, briefing tool processor 244 may cause the display of a briefing for the approach and may be activated by one click of an icon displayed on the VSD.

Figure 3:
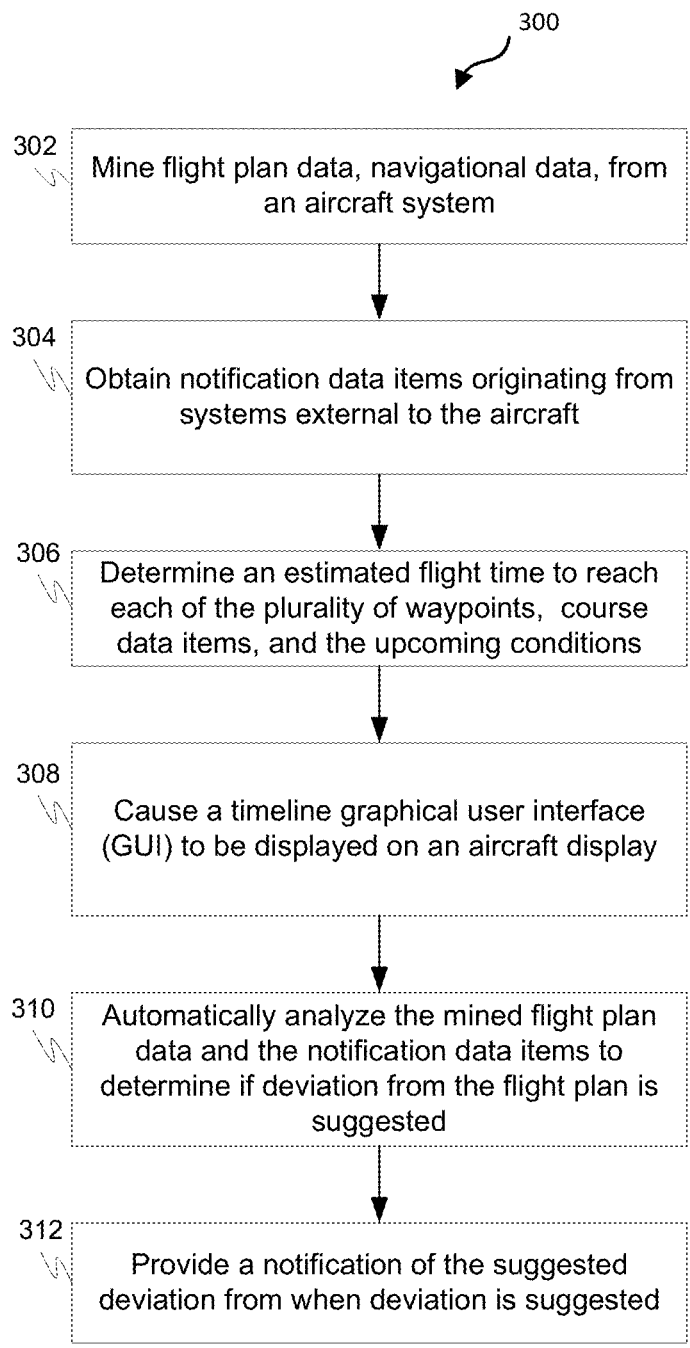
FIG. 3 is a process flow chart depicting an example process in flight deck equipment for providing navigational guidance to the flight crew, in accordance with some embodiments.

FIG. 3 is a process flow chart depicting an example process 300 in flight deck equipment for providing task management assistance in managing the flight path to the flight crew. The order of operation within the process is not limited to the sequential execution as illustrated in the figure but may be performed in one or more varying orders as applicable and in accordance with the present disclosure. In various embodiments, the process can be scheduled to run based on one or more predetermined events, and/or can run continuously during operation of the aircraft.

The example process 300 includes mining flight plan data and navigational data from an aircraft system (operation 302). The mined flight plan data may include a plurality of waypoints and other course data items for a current flight plan. The mined navigational data may include aircraft location, speed, and heading data.

The example process 300 includes obtaining notification data items originating from systems external to the aircraft (operation 304). The notification data items may indicate upcoming conditions that will affect the aircraft flight plan and a location at which the upcoming conditions will affect the aircraft flight plan. The example process 300 also includes determining an estimated flight time to reach each of the plurality of waypoints, course data items, and the upcoming conditions (operation 306).

The example process 300 includes causing a timeline graphical user interface (GUI) to be displayed on an aircraft display (operation 308). The timeline GUI is configured to display a timeline, waypoint graphical elements representative of the waypoints, course data item graphical elements representative of the other course data items, and notification data item graphical elements representative of the upcoming conditions. When displayed each waypoint graphical element, course data item graphical element and notification data item graphical element is positioned on the timeline along with the estimated time for the aircraft to reach the graphical element.

The example process 300 includes automatically analyzing the mined flight plan data and the notification data items to determine if deviation from the flight plan is suggested (operation 310) and providing a notification of the suggested deviation when deviation is suggested (operation 312). When deviation is suggested, one or more flight path deviation recommendation options may be provided. the notification of the suggested deviation may be in the form of a selectable deviation notification graphical element displayed on the integrated interactive GUI. Selection of the selectable deviation notification graphical element may cause the display of one or more selectable deviation recommendation graphical elements, wherein each may contain graphical data that is descriptive of a flight path deviation recommendation option. Selection of a selectable deviation recommendation graphical element may cause a preview of a flight path deviation recommendation option to be displayed on the map GUI and/or the VSD GUI. A flight path deviation recommendation option selected by the flight crew may also be submitted to ATC for approval. A selectable activate graphical element for flight crew selection may also be provide. The selectable activate graphical element when selected may cause a selected flight path deviation recommendation option to be activated.

Figure 4:
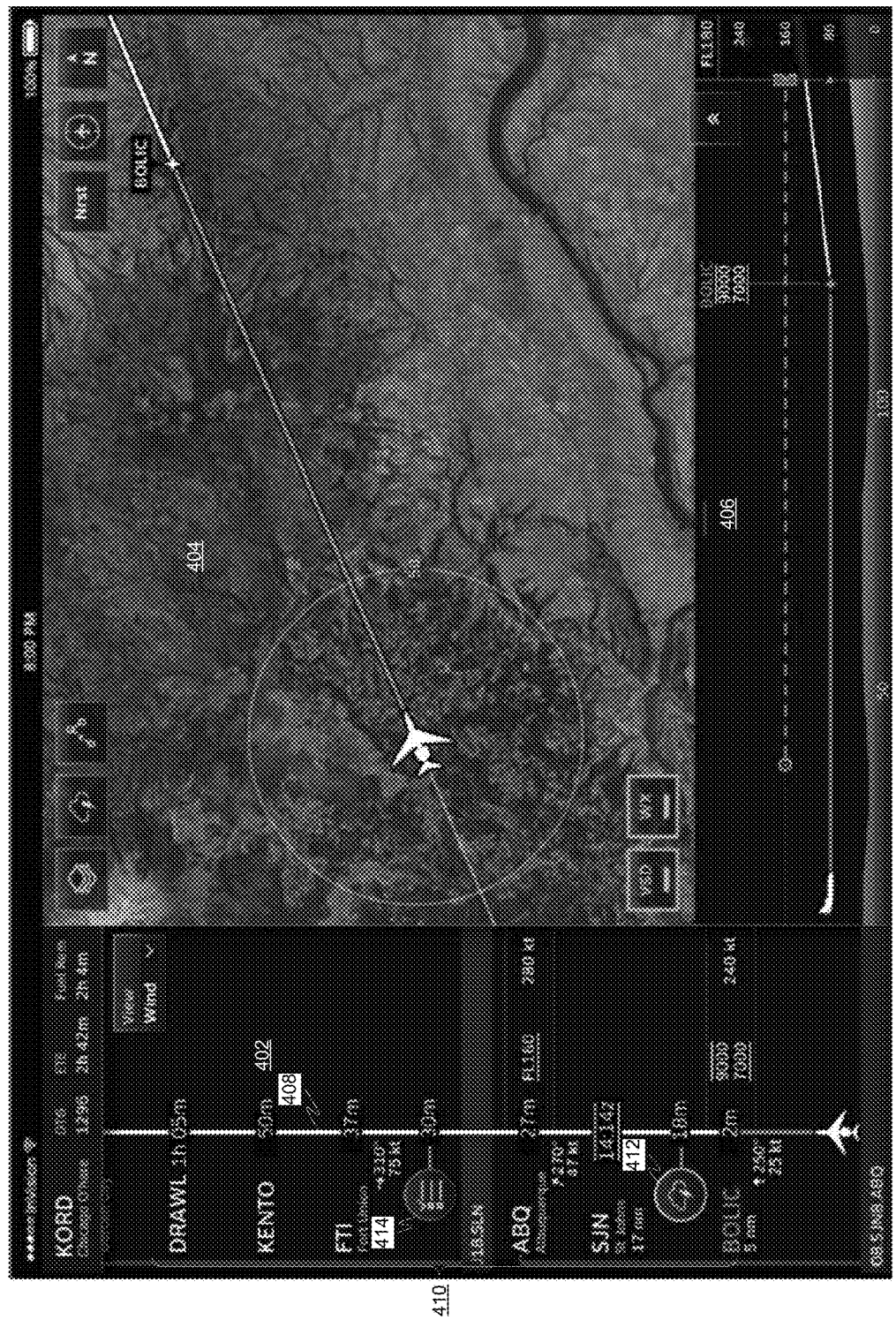
FIG. 4 is a diagram depicting an example integrated interactive graphical user interface (GUI) caused to be displayed by the integrated interactive display module, in accordance with some embodiments.

FIG. 4 is a diagram depicting an example integrated interactive graphical user interface (GUI) 400 caused to be displayed by the integrated interactive display module 214. The example GUI 400 includes: (i) an example timeline GUI 402, generated by the timeline module 216, that presents a visual waypoint list on a timeline, (ii) an example map GUI 404, generated by the navigation display module 218, that may present a 'birds-eye' viewpoint of a portion of a flight plan (as illustrated) and/or a three-dimensional (3-D) viewpoint (not shown), and (iii) an example VSD GUI 406, generated by the VSD module 220.

The example timeline GUI 402 shows a visual waypoint list 410 on a timeline 408. The waypoint list 410 is organized on the timeline 408 by time. The timeline GUI 402, via the timeline, can provide a flight preview to allow flight crew to preview the entire route or some segment of it. The waypoint information on the example timeline GUI 402 may include: time, altitude, speed, course, distance, FPA (Flight Path Angle), constraints, wind direction/speed, and other flight related information. The timeline GUI 402 can show frequency changes (including automated frequency changes) at different points in the flight path. The timeline GUI 402 can provide access to normal checklists (e.g., via checklist graphical element 414). Normal checklists are accessible via the waypoint list at the proper time and flight phase. The example timeline GUI 402 can provide Zulu to local time toggle at any point on the timeline. The example timeline GUI 402 can provide maximum altitude and fuel remaining at any point on the timeline. The example timeline GUI 402 can provide waypoint list scrolling and zooming and decluttering. The example timeline GUI 402 can provide flight crew defined reminders (e.g., at a specified distance, time, altitude). The example timeline GUI 402 can provide airport information at the destination (e.g., at the top of waypoint list).

The example timeline GUI 402 can integrate a waypoint list with smart scratchpad interactions. The smart scratchpad displays information such as Air Traffic Control issued clearances or data-linked information on the timeline GUI. The example timeline GUI 402 can display the current wind speed/direction and distance to next waypoint. The example timeline GUI 402 can display aircraft configuration change points (e.g., flaps, speed). The example timeline GUI 402 can provide access to a phase of flight briefing tool provided by the briefing tool processor 244 of the cognitive tools module 226. The phase of flight briefing tool provides briefing notes at the proper time and flight phase.

The example timeline GUI 402 can provide position reporting points. During flight operations, the flight crew may be required to provide position reports to ATC and/or their Operator HQ. Position reporting points are defined geographic locations at which the pilot must report crossing and are used for tracking the flight. The timeline GUI 402 can provide a mechanism for the flight crew to send the report of their current position (e.g., lat/lon).

The example timeline GUI 402 can facilitate tactical modifications of the flight plan (e.g., direct to modification) via the flight path deviation processor 228 of the cognitive tools module 226. The example timeline GUI 402 can display aeronautical information retrieved from automatic terminal information service (ATIS) broadcasts (e.g., by the data mining module 212). The flight crew may search the example timeline GUI 402 for flight related aeronautical information.

The example timeline GUI 402 can allow for departure/arrival selection. Departure and arrival procedures govern the flight path the aircraft will fly when it departs or arrives at an airport. These airspace procedures must be selected and input into the flight management system. Before flight, the example timeline GUI 402 can allow the flight crew to directly update the airport city pair (departure and arrival airports) in the flight plan. For flights that are en route, the example timeline GUI 402 can allow the flight crew to directly update the arrival airport, which would cause the generation of a new flight plan and associated waypoints, fuel burn, ETA, etc.

The example timeline GUI 402 can allow for normal checklist modification due to MEL (minimum equipment list) or NNC (non-normal checklist). The timeline GUI 402 can allow for updates and modifications to checklists if there is an equipment failure (e.g., indicated by the MEL) or some sort of weather condition that requires a different checklist to be displayed due to the effects of the condition on the aircraft or the flight plan. If a MEL or NNC requires a change to a normal checklist step, the change would be indicated in the normal checklist on the timeline.

The example timeline GUI 402 can indicate the active mode and next mode change. Active modes are those that are currently engaged by the autopilot. Next modes are those that are armed to become active subsequently once the relevant conditions are met.

The example timeline GUI 402 can display various notifications. The notifications may include significant weather along planned flight plan (e.g., icon 412), airport information changes at the destination airport, ATIS updates, NOTAMs filtered for computed flight plan, incomplete checklists/tasks, special use airspace notifications, temporary flight restrictions (TFRs), departure/arrival delays, and others. The example timeline GUI 402 can allow for multimodal interaction (touch, speech, gesture, cursor).

Figure 5:
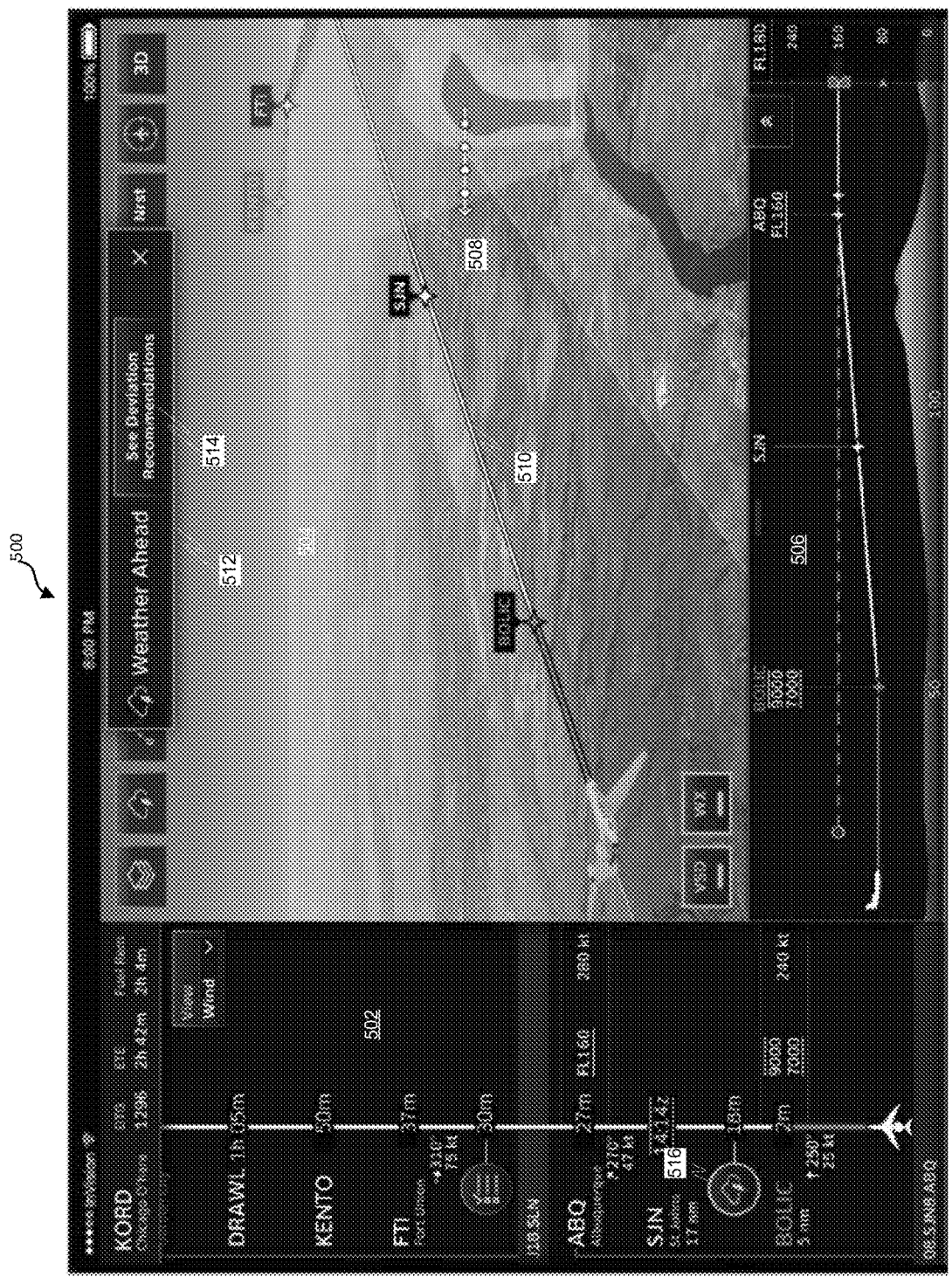
FIG. 5 is a diagram depicting another example integrated interactive GUI caused to be displayed by the integrated interactive display module, in accordance with some embodiments.

The example map GUI 404 can toggle between birds-eye and exocentric perspective view. In the exocentric perspective view, the example map GUI 404 can show volumetric representation of weather, precipitation, clouds on navigation layer relative to flight path, and exocentric view of aircraft (as illustrated in FIG. 5). The example map GUI 404 can show a best alternate along the route of flight with predefined criteria and pilot selectable criteria.

The example VSD GUI 406 can provide performance limitations/capabilities (e.g., inflight restart envelope, driftdown, etc.). The example VSD GUI 406 can show a vertical direct to route change.

FIG. 5 is a diagram depicting another example integrated interactive graphical user interface (GUI) 500 caused to be displayed by the integrated interactive display module 214. The example GUI 500 includes: (i) an example timeline GUI 502, generated by the timeline module 216, that presents a visual waypoint list on a timeline, (ii) an example map GUI 504, generated by the navigation display module 218, that, in this example, presents a 3-D viewpoint, and (iii) an example VSD GUI 506, generated by the VSD module 220.

In this example, the integrated interactive GUI 500 includes on the map GUI 504 a graphical depiction of a weather pattern 508 threatening the flight path 510 and a weather alert graphical element 512, overlaid over the map GUI 504. The weather alert graphical element 512 includes a selectable button 514 to allow a user to view automatically generated flight path deviation recommendations calculated by the system (e.g., flight path deviation processor 128) due to the threatening weather pattern 508. The weather alert graphical element 512 is displayed as a result of user selection of the significant weather icon 516 displayed on the timeline GUI 502.

Figure 6:
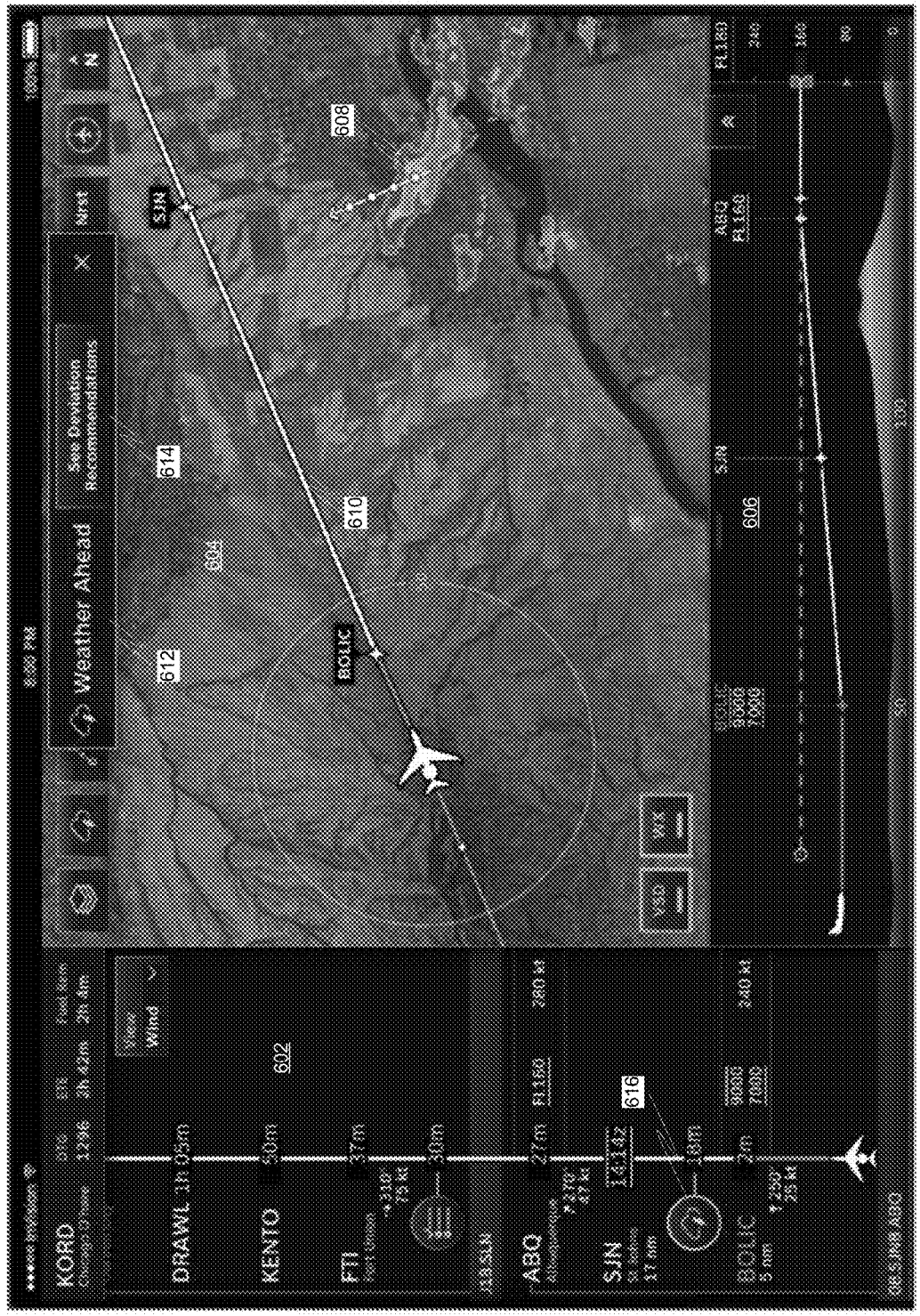
FIG. 6 is a diagram depicting another example integrated interactive GUI caused to be displayed by the integrated interactive display module, in accordance with some embodiments.

FIG. 6 is a diagram depicting another example integrated interactive graphical user interface (GUI) 600 caused to be displayed by the integrated interactive display module 214. The example GUI 600 includes: (i) an example timeline GUI 602, generated by the timeline module 216, that presents a visual waypoint list on a timeline, (ii) an example map GUI 604, generated by the navigation display module 218, that, in this example, presents birds-eye viewpoint, and (iii) an example VSD GUI 606, generated by the VSD module 220.

In this example, the integrated interactive GUI 600 includes on the map GUI 604 a graphical depiction of a weather pattern 608 threatening the flight path 610 and a weather alert graphical element 612, overlaid over the map GUI 604. The weather alert graphical element 612 includes a selectable button 614 to allow a user to view automatically generated flight path deviation recommendations calculated by the system (e.g., flight path deviation processor 128) due to the threatening weather pattern 608. The weather alert graphical element 612 is displayed as a result of user selection of the significant weather icon 616 displayed on the timeline GUI 602.

Figure 7:
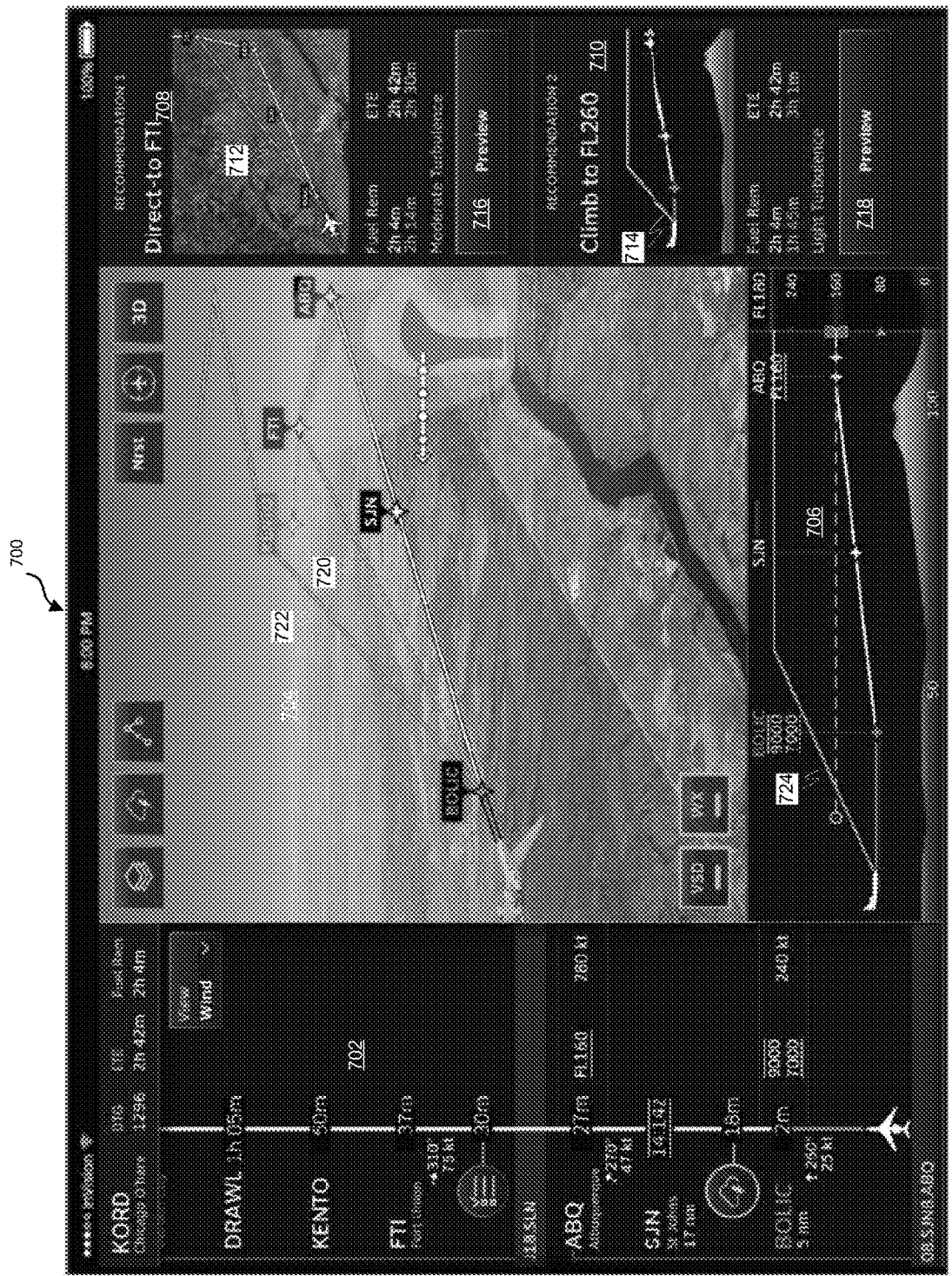
FIG. 7 is a diagram depicting another example integrated interactive GUI caused to be displayed by the integrated interactive display module, in accordance with some embodiments.

FIG. 7 is a diagram depicting another example integrated interactive graphical user interface (GUI) 700 caused to be displayed by the integrated interactive display module 214. The example GUI 700 includes: (i) an example timeline GUI 702, generated by the timeline module 216, that presents a visual waypoint list on a timeline, (ii) an example map GUI 704, generated by the navigation display module 218, that, in this example, presents a 3-D viewpoint, (iii) an example VSD GUI 706, generated by the VSD module 220, (iv) a first deviation recommendation GUI 708, and (v) a second deviation recommendation GUI 710.

In this example, the first deviation recommendation GUI 708 shows a lateral flight path deviation recommendation 712 and the second deviation recommendation GUI 708 shows a vertical flight path deviation recommendation 714. The deviation recommendation GUIs 708, 710 also show flight differences achieved by taking the recommendation. The first deviation recommendation GUI 708 shows that fuel remaining from accepting the deviation recommendation increases from 2 h 4 m to 2 h 14 m and shows that estimated travel decreases from 2 h 42 m to 2 h 30 m. The second deviation recommendation GUI 710 shows that fuel remaining from accepting the deviation recommendation decreases from 2 h 4 m to 1 h 45 m and shows that estimated travel increases from 2 h 42 m to 3 h 1 m. Each of the first deviation recommendation GUI 708 and the second deviation recommendation GUI 708 includes a selectable preview button 716, 718. Selection of the preview button 716 can cause the first recommendation to be previewed on the map GUI 704 as flight path deviation 720. Selection of the preview button 718 can cause the second recommendation to be previewed on the map GUI 704 as flight path deviation 722 and on the VSD GUI 706 as flight path deviation 724.

Figure 8:
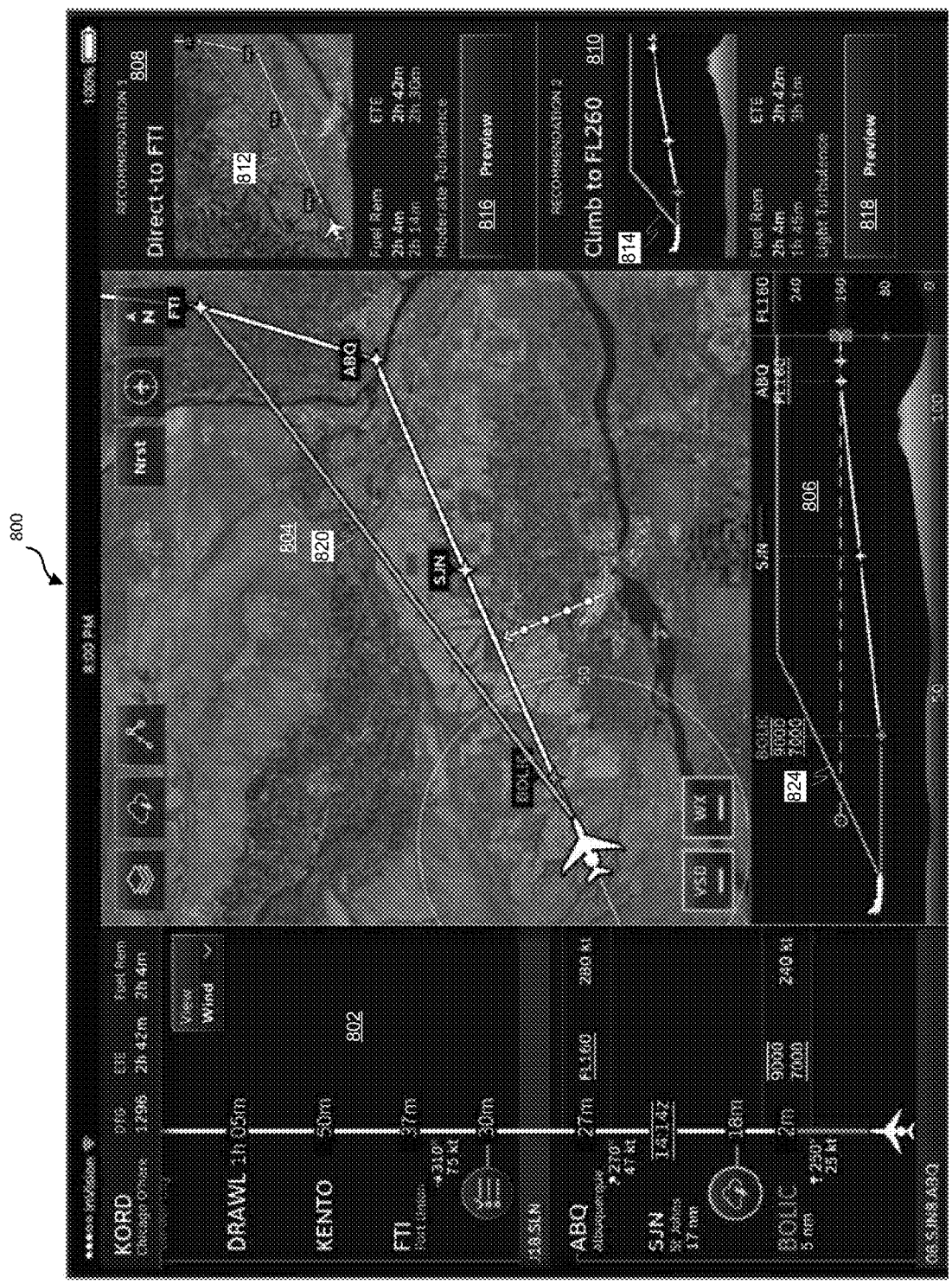
FIG. 8 is a diagram depicting another example integrated interactive GUI caused to be displayed by the integrated interactive display module, in accordance with some embodiments.

FIG. 8 is a diagram depicting another example integrated interactive graphical user interface (GUI) 800 caused to be displayed by the integrated interactive display module 214. The example GUI 800 includes: (i) an example timeline GUI 802, generated by the timeline module 216, that presents a visual waypoint list on a timeline, (ii) an example map GUI 804, generated by the navigation display module 218, that, in this example, presents a birds-eye viewpoint, (iii) an example VSD GUI 806, generated by the VSD module 220, (vi) a first deviation recommendation GUI 808, and (v) a second deviation recommendation GUI 810.

In this example, the first deviation recommendation GUI 808 shows a lateral flight path deviation recommendation 812 and the second deviation recommendation GUI 808 shows a vertical flight path deviation recommendation 814. The deviation recommendation GUIs 808, 810 also show flight differences achieved by taking the recommendation. The first deviation recommendation GUI 808 shows that fuel remaining from accepting the deviation recommendation increases from 2 h 4 m to 2 h 14 m and shows that estimated travel decreases from 2 h 42 m to 2 h 30 m. The second deviation recommendation GUI 810 shows that fuel remaining from accepting the deviation recommendation decreases from 2 h 4 m to 1 h 45 m and shows that estimated travel increases from 2 h 42 m to 3 h 1 m. Each of the first deviation recommendation GUI 808 and the second deviation recommendation GUI 808 includes a selectable preview button 816, 818. Selection of the preview button 816 can cause the first recommendation to be previewed on the map GUI 804 as flight path deviation 820. Selection of the preview button 818 can cause the second recommendation to be previewed on the VSD GUI 806 as flight path deviation 824.

Figure 9:
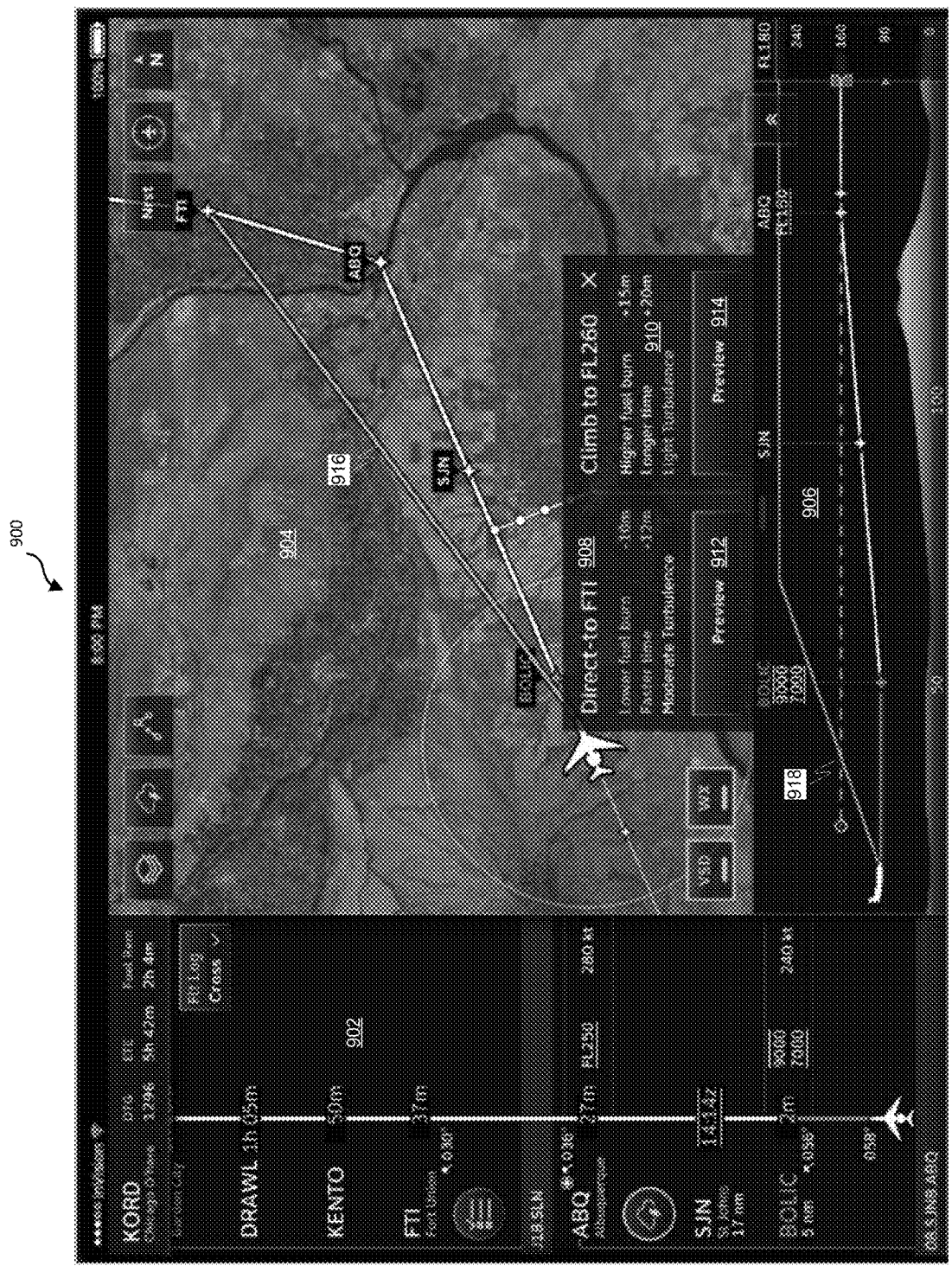
FIG. 9 is a diagram depicting another example integrated interactive GUI caused to be displayed by the integrated interactive display module, in accordance with some embodiments.

FIG. 9 is a diagram depicting another example integrated interactive graphical user interface (GUI) 900 caused to be displayed by the integrated interactive display module 214. The example GUI 900 includes: (i) an example timeline GUI 902, generated by the timeline module 216, that presents a visual waypoint list on a timeline, (ii) an example map GUI 904, generated by the navigation display module 218, that, in this example, presents a birds-eye viewpoint, (iii) an example VSD GUI 906, generated by the VSD module 220, (vi) a first deviation recommendation GUI 908, and (v) a second deviation recommendation GUI 910.

In this example, the first deviation recommendation GUI 908 and the second deviation recommendation GUI 908 are overlaid the map GUI 904. The deviation recommendation GUIs 908, 910 also show flight differences achieved by taking the recommendation. The first deviation recommendation GUI 908 shows lower fuel burn of −10 m, faster travel of −12 m, and moderate turbulence from accepting the deviation recommendation. The second deviation recommendation GUI 910 shows higher fuel burn of −15 m, longer travel of −20 m, and light turbulence from accepting the deviation recommendation. Each of the first deviation recommendation GUI 908 and the second deviation recommendation GUI 908 includes a selectable preview button 912, 914. Selection of the preview button 912 can cause the first recommendation to be previewed on the map GUI 904 as flight path deviation 916. Selection of the preview button 914 can cause the second recommendation to be previewed on the VSD GUI 906 as flight path deviation 918.

Figure 10:
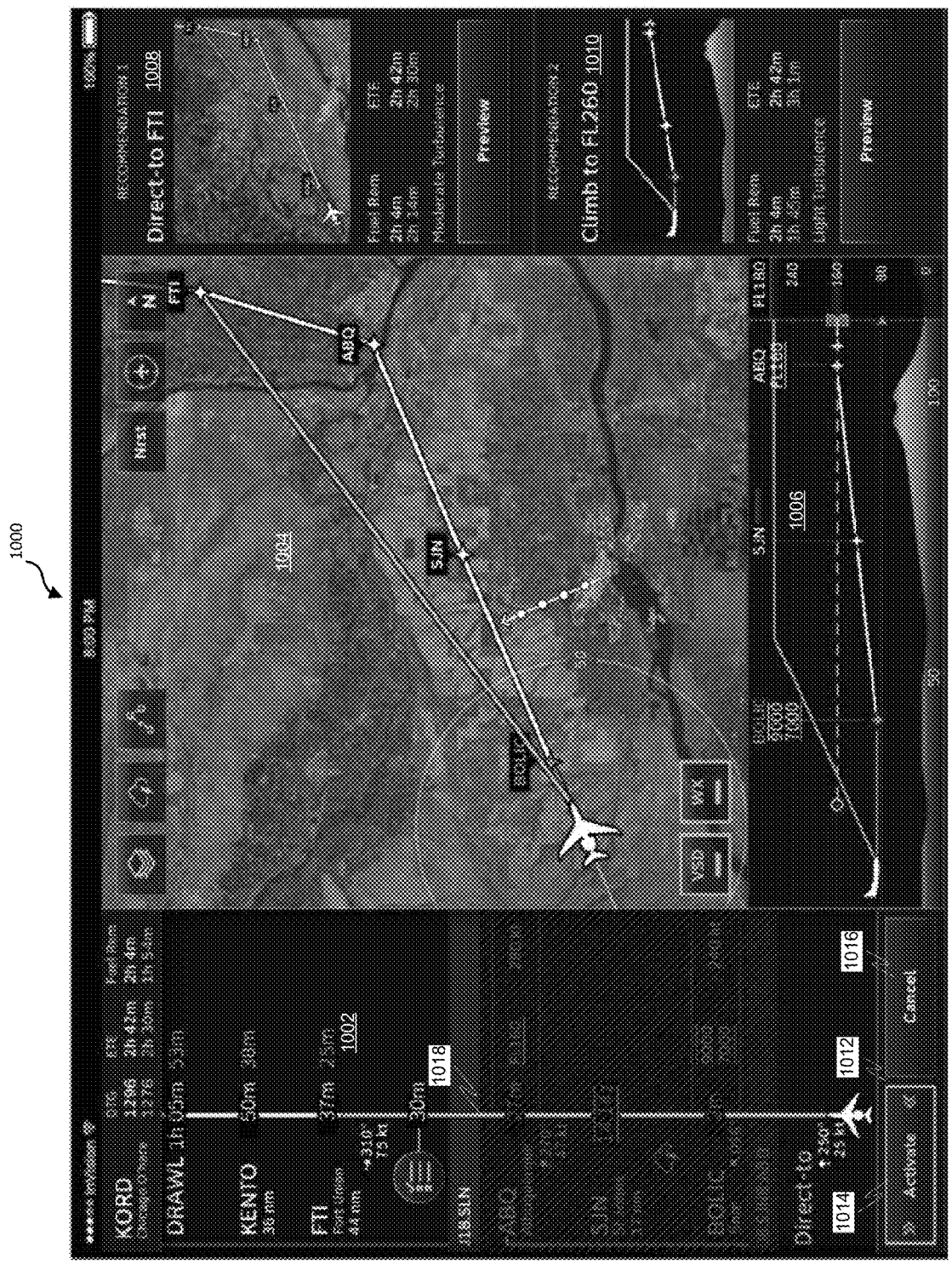
FIG. 10 is a diagram depicting another example integrated interactive GUI caused to be displayed by the integrated interactive display module, in accordance with some embodiments.

FIG. 10 is a diagram depicting another example integrated interactive graphical user interface (GUI) 1000 caused to be displayed by the integrated interactive display module 214. The example GUI 1000 includes: (i) an example timeline GUI 1002, generated by the timeline module 216, that presents a visual waypoint list on a timeline, (ii) an example map GUI 1004, generated by the navigation display module 218, that, in this example, presents a birds-eye viewpoint, (iii) an example VSD GUI 1006, generated by the VSD module 220, (iv) a first deviation recommendation GUI 1008, (v) a second deviation recommendation 1010 GUI, and (vi) an activation GUI 1012 that includes an activate button 1014 and a cancel button 1016.

In this example, selection of the Direct-to deviation option results in the Direct-to activation GUI 1012 being displayed. Selection of the activate button 1014 causes the activation of the selected deviation option and a change in the timeline display 1018 that reflects the change in flight path due to the selected flight path deviation.

Figure 11:
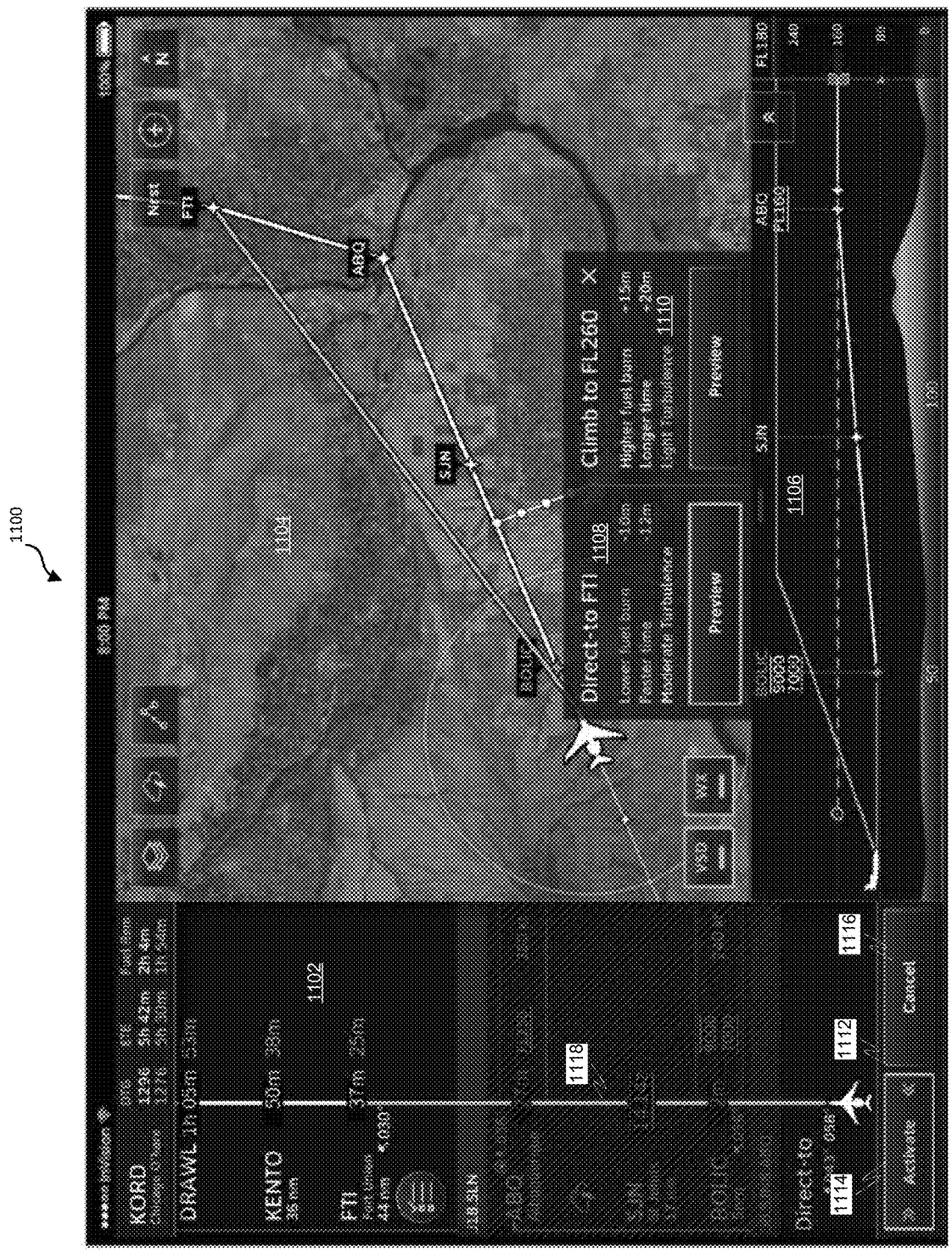
FIG. 11 is a diagram depicting another example integrated interactive GUI caused to be displayed by the integrated interactive display module, in accordance with some embodiments.

FIG. 11 is a diagram depicting another example integrated interactive graphical user interface (GUI) 1100 caused to be displayed by the integrated interactive display module 214. The example GUI 1100 includes: (i) an example timeline GUI 1102, generated by the timeline module 216, that presents a visual waypoint list on a timeline, (ii) an example map GUI 1104, generated by the navigation display module 218, that, in this example, presents a birds-eye viewpoint, (iii) an example VSD GUI 1106, generated by the VSD module 220, (vi) a first deviation recommendation GUI 1108, and (v) a second deviation recommendation GUI 1110.

In this example, the first deviation recommendation GUI 1108 and the second deviation recommendation GUI 1108 are overlaid the map GUI 1104. Selection of the Direct-to deviation option results in the Direct-to activation GUI 1112 being displayed. Selection of the activate button 1114 causes the activation of the selected deviation option and a change in the timeline display 1118 that reflects the change in flight path due to the selected flight path deviation.

Figure 12:
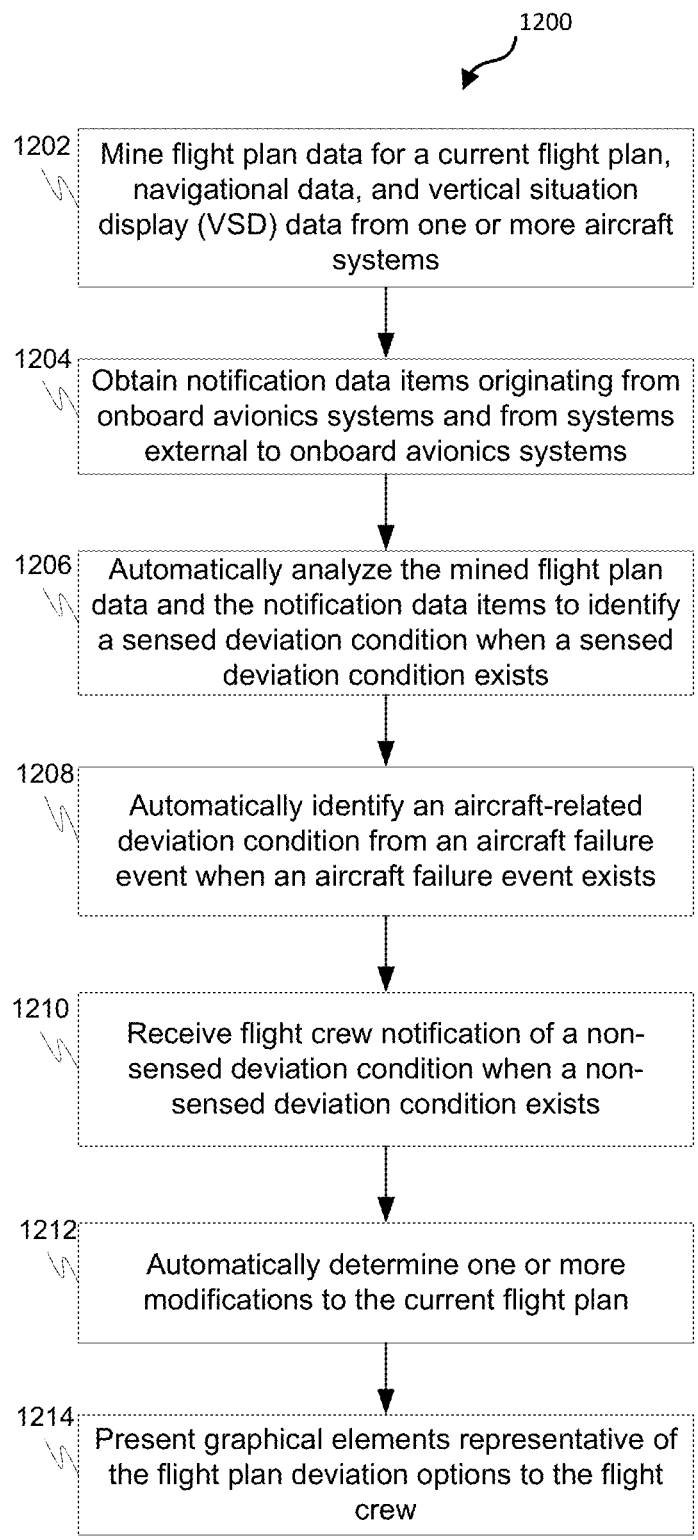
FIG. 12 is a process flow chart depicting another example process in flight deck equipment for providing task management assistance in managing the flight path to the flight crew, in accordance with some embodiments.

FIG. 12 is a process flow chart depicting an example process 1200 in flight deck equipment for providing task management assistance in managing the flight path to the flight crew. The order of operation within the process is not limited to the sequential execution as illustrated in the figure but may be performed in one or more varying orders as applicable and in accordance with the present disclosure. In various embodiments, the process can be scheduled to run based on one or more predetermined events, and/or can run continuously during operation of the aircraft.

The example process 1200 includes mining flight plan data for a current flight plan, navigational data, and vertical situation display (VSD) data from one or more aircraft systems (operation 1202). The mined flight plan data may include a plurality of waypoints and other course data items for a current flight plan. The other course data items may include a plurality of a scheduled altitude change, scheduled speed change, a scheduled heading change, and an altitude, speed, or time restriction. The mined navigational data may include aircraft location, speed, and heading data. The mined VSD data may include a vertical profile of the aircraft for the current flight plan, an altitude reference, terrain data, and glideslope data. The one or more aircraft systems may include an onboard flight management system (FMS); or an electronic flight bag (EFB) application on which the flight plan was created and wherein the flight plan was synced with or loaded into an onboard avionics system (such as, an onboard flight management system (FMS)) from the EFB application.

The example process 1200 includes obtaining notification data items originating from onboard avionics systems and from systems external to onboard avionics systems (operation 1204). The notification data items indicate upcoming conditions that will affect the current flight plan. The notification data items include airport data, runway data, navigation data, map data, weather data, ATC alert data, traffic alert data, applicable Notices to Airmen (NOTAMS), aviation electronic checklist data, aircraft data, aircraft weight data, aircraft fuel data, timing data, distance data, airport facilities data, emergency services data, aircraft equipment trouble alert, a flight crew configurable reminder, a hold reminder for a waypoint indicating a desire to hold at the waypoint, an airport change notice, special use airspace notice, departure delay notice, or arrival delay notice, legality data, and/or flight plan deviation data from one or more remote servers.

The example process 1200 includes automatically analyzing the mined flight plan data and the notification data items to identify a sensed deviation condition when a sensed deviation condition exists (operation 1206). A sensed deviation condition may include a weather condition along or approaching the flight path, an airport closure at a planned destination airport, a runway closure at a planned destination runway, and/or an airspace restriction along the planned flight path that causes a desire for a flight plan deviation.

The example process 1200 includes automatically identifying an aircraft-related deviation condition from an aircraft failure event when an aircraft failure event exists (operation 1208). An aircraft failure event may include a hydraulic failure, electrical system failure, engine failure, and/or flight automation failure The example process 1200 includes receiving flight crew notification of a non-sensed deviation condition when a non-sensed deviation condition exists (operation 1210). A non-sensed deviation condition comprises an on-board medical emergency.

The example process 1200 includes automatically determining one or more modifications to the current flight plan (operation 1212). The one or more modifications are determined to generate a plurality of flight plan deviation options to accommodate a sensed deviation condition, an aircraft-related deviation condition, or a non-sensed deviation condition. Automatically determining one or more modifications to the current flight plan to generate a plurality of flight plan deviation options may include incorporating operational limitations and checklist requirements in deviation planning.

The example process 1200 includes presenting graphical elements representative of the flight plan deviation options to the flight crew (operation 1214). The deviation options are presented on an integrated interactive graphical user interface (GUI) comprising a timeline GUI, a map GUI, and a VSD GUI displayed on an aircraft display. Presenting graphical elements representative of the flight plan deviation options to the flight crew on an integrated interactive graphical user interface (GUI) may include causing the display of a selectable deviation notification graphical element on the integrated interactive GUI. Selection of a selectable deviation notification graphical element may cause the display of one or more selectable deviation recommendation graphical elements, each containing graphical data that is descriptive of a flight path deviation recommendation option. Selection of a selectable deviation recommendation graphical element may cause a preview of a flight path deviation recommendation option to be displayed on the map GUI and/or the VSD GUI. The timeline GUI may be configured to display a timeline, waypoint graphical elements representative of the waypoints, course data item graphical elements representative of the other course data items, and notification data item graphical elements representative of upcoming conditions, and wherein when displayed each waypoint graphical element, course data item graphical element and notification data item graphical element is positioned on the timeline along with the estimated time for the aircraft to reach the graphical element.

Presenting graphical elements representative of the flight plan deviation options to the flight crew may further allow for submitting a flight path deviation recommendation option selected by the flight crew to ATC for approval and providing a selectable activate graphical element for flight crew selection that when selected causes a selected flight path deviation recommendation option to be activated.

In one embodiment, a flight deck system for providing task management assistance in managing the flight path to the flight crew is provided. The system comprises one or more processors configured by programming instructions on non-transient computer readable media. The system is configured to: mine flight plan data, navigational data, and vertical situation display (VSD) data from one or more aircraft systems, the mined flight plan data including a plurality of waypoints and other course data items for a current flight plan, the mined navigational data comprising aircraft location, speed, and heading data, the mined VSD data comprising a vertical profile of the aircraft for the current flight plan, an altitude reference, terrain data, and glideslope data; obtain notification data items originating from systems external to avionics systems on the aircraft that indicate upcoming conditions that will affect the aircraft flight plan and a location at which the upcoming conditions will affect the aircraft flight plan; determine an estimated flight time to reach each of the plurality of waypoints, course data items, and the upcoming conditions; cause an integrated interactive graphical user interface (GUI) comprising a timeline GUI, a map GUI, and a VSD GUI to be displayed on an aircraft display, wherein the timeline GUI is configured to display a timeline, waypoint graphical elements representative of the waypoints, course data item graphical elements representative of the other course data items, and notification data item graphical elements representative of the upcoming conditions, and wherein when displayed each waypoint graphical element, course data item graphical element and notification data item graphical element is positioned on the timeline along with the estimated time for the aircraft to reach the graphical element; automatically analyze the mined flight plan data and the notification data items to determine if deviation from the flight plan is suggested (e.g., not enough fuel, weather requires deviation, airport diversion required); and provide a notification of the suggested deviation when deviation is suggested.

These aspects and other embodiments may include one or more of the following features. To analyze the mined flight plan data and the notification data items, the flight deck system may be configured to analyze the mined flight plan data and the notification data items to identify a mission altering event (e.g., non-emergency condition) that due to time, fuel or safety considerations raises concerns regarding the current aircraft travel path and identify one or more flight path deviation recommendation options for the aircraft to minimize the impact of or avoid the mission altering event. The notification of the suggested deviation may be in the form of a selectable deviation notification graphical element displayed on the integrated interactive GUI. Selection of the selectable deviation notification graphical element may cause the display of one or more selectable deviation recommendation graphical elements, each containing graphical data that may be descriptive of a flight path deviation recommendation option. Selection of a selectable deviation recommendation graphical element may cause a preview of a flight path deviation recommendation option to be displayed on the map GUI and/or the VSD GUI. The flight deck system may be further configured to submit a flight path deviation recommendation option selected by the flight crew to ATC for approval. The flight deck system may be further configured to provide a selectable activate graphical element for flight crew selection that when selected causes a selected flight path deviation recommendation option to be activated. The map GUI may be configurable to switch between displaying a three-dimensional (3-D) map display and a birds-eye view map display. The other course data items may comprise a plurality of a scheduled altitude change, scheduled speed change, a scheduled heading change, and an altitude, speed, or time restriction.

To determine an estimated flight time, the flight deck system may be configured to determine an estimated flight time based on the navigational data (e.g. current aircraft location, speed, heading). The notification data items may comprise one or more of an aviation electronic checklist, a weather alert, an ATC alert, a traffic alert, NOTAMS, aircraft equipment trouble alert, a flight crew configurable reminder, a hold reminder for a waypoint indicating a desire to hold at the waypoint, an airport change notice (e.g., closed runway, destination airport problem), special use airspace notice, departure delay notice, or arrival delay notice. The notification data items may be selectable and when selected causes the display of additional information regarding the notification data item. The timeline may be a moving timeline that may be systematically adjusted to show displayed waypoint graphical elements, course data item graphical elements, and notification data item graphical elements moving closer to an aircraft graphical element representative of the aircraft located at one end of the moving timeline. The timeline GUI may be configured to display, adjacent to each displayed waypoint graphical element, course data item graphical element, and notification data item graphical element the projected time to reach and a distance from the location at which the waypoint graphical element, course data item graphical element, and notification data item graphical element may be relevant.

The flight deck system may further comprise a flight path deviation processor, wherein the flight path deviation processor comprises one or more processors configured by programming instructions on non-transient computer readable media. The flight path deviation processor may be a rule-based system that compares options for lateral and vertical flight path deviations and presents the computed best options based on current aircraft performance. Deviation recommendations from the flight path deviation processor may be accessible directly from a link on the timeline GUI.

The flight deck system may further comprise an airport diversion processor, wherein the airport diversion processor comprises one or more processors configured by programming instructions on non-transient computer readable media. The airport diversion processor may be a rule-based system that compares options for diversions and presents the best airport options based on current aircraft performance, fuel, airport services, and runways, distance, or other pilot selectable criteria, and wherein the airport diversion assistant may be accessible directly from a link on the timeline GUI and from non-normal checklists that require landing as soon as practical.

The flight deck system may further comprise an Arrival/departure windows processor configured to calculate Arrival/departure windows at an airport due to limitations and weather, wherein the Arrival/departure windows processor comprises one or more processors configured by programming instructions on non-transient computer readable media. The Arrival/departure windows processor may be a rule based system that shows the current arrival/departure timing at the departure airport and destination airport given the current aircraft performance and weather.

The flight deck system may further comprise a route calculation processor for computing the best alternate route based on a set of default criteria as well as pilot selectable criteria. The route calculation processor comprises one or more processor configured by programming instructions on non-transient computer readable media. The route calculation processor may be a rule-based system that searches the airport database and airport information to match the criteria and presents options to the flight crew.

The flight deck system may further comprise a routing patterns processor for computing ATC/routing patterns along planned route/destination. The routing patterns processor comprises one or more processors configured by programming instructions on non-transient computer readable media. The routing patterns processor may be a machine learning system that merges historical air traffic data with weather data and current traffic and ATC routing to show what the current air traffic and how that may change when a significant event, such as weather or airport closure, occurs.

The flight deck system may further comprise a weather tracking processor for weather tracking along the route. The weather tracking processor comprises one or more processors configured by programming instructions on non-transient computer readable media. The weather tracking processor may be configured to continuously monitor weather data to provide a notice to the flight crew when the ceiling at the destination approaches minimums or may be below minimums.

The flight deck system may further comprise a Missed approach/Go around processor. The Missed approach/Go around processor comprises one or more processors configured by programming instructions on non-transient computer readable media. The Missed approach/Go around processor may be configured to The flight deck system may further comprise a conversion calculation processor for converting different units, such as pounds to kilograms, feet to meters, kilometers to nautical miles, statute miles to nautical miles, and more. The conversion calculation processor comprises one or more processors configured by programming instructions on non-transient computer readable media. The conversion calculation processor may be made available for use via the timeline GUI.

The flight deck system may further comprise a briefing tool processor for guiding pilot through briefing items for the next flight phase. The briefing tool processor may comprise one or more processors configured by programming instructions on non-transient computer readable media. The briefing tool processor is configured to display the briefing verbiage, procedure to be flown, and associated charts.

In another embodiment, a method in a flight deck system for providing task management assistance in managing the flight path to the flight crew is provided. The method comprises: mining flight plan data and navigational data from an aircraft system, wherein the mined flight plan data includes a plurality of waypoints and other course data items for a current flight plan, and wherein the mined navigational data comprises aircraft location, speed, and heading data; obtaining notification data items originating from systems external to the aircraft that indicate upcoming conditions that will affect the aircraft flight plan and a location at which the upcoming conditions will affect the aircraft flight plan; determining an estimated flight time to reach each of the plurality of waypoints, course data items, and the upcoming conditions; causing a timeline graphical user interface (GUI) to be displayed on an aircraft display, wherein the timeline GUI is configured to display a timeline, waypoint graphical elements representative of the waypoints, course data item graphical elements representative of the other course data items, and notification data item graphical elements representative of the upcoming conditions, and wherein when displayed each waypoint graphical element, course data item graphical element and notification data item graphical element is positioned on the timeline along with the estimated time for the aircraft to reach the graphical element; automatically analyzing the mined flight plan data and the notification data items to determine if deviation from the flight plan is suggested (e.g., not enough fuel, weather requires deviation, diversion required); and providing a notification of the suggested deviation from when deviation is suggested.

These aspects and other embodiments may include one or more of the following features. The method may further comprise generating one or more flight path deviation recommendation options when deviation is suggested. The notification of the suggested deviation may be in the form of a selectable deviation notification graphical element displayed on the integrated interactive GUI. Selection of the selectable deviation notification graphical element may cause the display of one or more selectable deviation recommendation graphical elements, wherein each contains graphical data that is descriptive of a flight path deviation recommendation option. Selection of a selectable deviation recommendation graphical element may cause a preview of a flight path deviation recommendation option to be displayed on the map GUI and/or the VSD GUI. The method may further comprise submitting a flight path deviation recommendation option selected by the flight crew to ATC for approval. The method may further comprise providing a selectable activate graphical element for flight crew selection that when selected causes a selected flight path deviation recommendation option to be activated.

In another embodiment, non-transient computer readable media encoded with programming instructions configurable to cause a processor in an aircraft to perform a method is provided. The method comprises: mining flight plan data and navigational data from an aircraft system, wherein the mined flight plan data includes a plurality of waypoints and other course data items for a current flight plan, and wherein the mined navigational data comprises aircraft location, speed, and heading data; obtaining notification data items originating from systems external to the aircraft that indicate upcoming conditions that will affect the aircraft flight plan and a location at which the upcoming conditions will affect the aircraft flight plan; determining an estimated flight time to reach each of the plurality of waypoints, course data items, and the upcoming conditions; causing a timeline graphical user interface (GUI) to be displayed on an aircraft display, wherein the timeline GUI is configured to display a timeline, waypoint graphical elements representative of the waypoints, course data item graphical elements representative of the other course data items, and notification data item graphical elements representative of the upcoming conditions, and wherein when displayed each waypoint graphical element, course data item graphical element and notification data item graphical element is positioned on the timeline along with the estimated time for the aircraft to reach the graphical element; automatically analyzing the mined flight plan data and the notification data items to determine if deviation from the flight plan is suggested (e.g., not enough fuel, weather requires deviation, diversion required); and providing a notification of the suggested deviation from when deviation is suggested.

In another embodiment, a flight deck system for providing task management assistance in managing the flight path to the flight crew is provided. The system comprises one or more processors configured by programming instructions on non-transient computer readable media. The system is configured to: mine flight plan data for a current flight plan, navigational data, and vertical situation display (VSD) data from one or more aircraft systems; obtain notification data items originating from onboard avionics systems and from systems external to onboard avionics systems that indicate upcoming conditions that will affect the current flight plan; automatically analyze the mined flight plan data and the notification data items to identify a sensed deviation condition; automatically identify an aircraft-related deviation condition from an aircraft failure event; receive flight crew notification of a non-sensed deviation condition; automatically determine one or more modifications to the current flight plan to generate a plurality of flight plan deviation options to accommodate a sensed deviation condition, an aircraft-related deviation condition, or a non-sensed deviation condition; and present graphical elements representative of the flight plan deviation options to the flight crew on an integrated interactive graphical user interface (GUI) comprising a timeline GUI, a map GUI, and a VSD GUI displayed on an aircraft display.

These aspects and other embodiments may include one or more of the following features. A deviation condition may comprise a weather condition along or approaching the flight path, an airport closure at a planned destination airport, a runway closure at a planned destination runway, and/or an airspace restriction along the planned flight path that causes a desire for a flight plan deviation. The aircraft failure event may comprise a hydraulic failure, electrical system failure, engine failure, and/or flight automation failure. The non-sensed deviation condition may comprise an on-board medical emergency. To automatically determine one or more modifications to the current flight plan to generate a plurality of flight plan deviation options, the flight deck system may be configured to incorporate operational limitations and checklist requirements in deviation planning. To present graphical elements representative of the flight plan deviation options to the flight crew on an integrated interactive graphical user interface (GUI), the flight deck system may be configured to cause the display of a selectable deviation notification graphical element on the integrated interactive GUI. Selection of a selectable deviation notification graphical element may cause the display of one or more selectable deviation recommendation graphical elements, wherein each contains graphical data that may be descriptive of a flight path deviation recommendation option. Selection of a selectable deviation recommendation graphical element may cause a preview of a flight path deviation recommendation option to be displayed on the map GUI and/or the VSD GUI. The flight deck system may be further configured to submit a flight path deviation recommendation option selected by the flight crew to ATC for approval. The flight deck system may be further configured to provide a selectable activate graphical element for flight crew selection that when selected causes a selected flight path deviation recommendation option to be activated. The flight deck system may further comprise a flight path deviation processor, wherein the flight path deviation processor comprises one or more processor configured by programming instructions on non-transient computer readable media. The flight path deviation processor may be a rule-based system that compares options for lateral and vertical flight path deviations and presents the computed best options based on current aircraft performance. The flight path deviation processor may be accessible directly from a link on the timeline GUI. The one or more aircraft systems may comprise: an onboard flight management system (FMS), or an electronic flight bag (EFB) application on which the flight plan was created and wherein the flight plan was synced with or loaded into an onboard avionics system (such as, an onboard flight management system (FMS)) from the EFB application. The mined flight plan data may include a plurality of waypoints and other course data items for a current flight plan, wherein the other course data items comprises a plurality of a scheduled altitude change, scheduled speed change, a scheduled heading change, and an altitude, speed, or time restriction. The mined navigational data may include aircraft location, speed, and heading data. The mined VSD data may include a vertical profile of the aircraft for the current flight plan, an altitude reference, terrain data, and glideslope data. The notification data items may comprise airport data, runway data, navigation data, map data, weather data, ATC alert data, traffic alert data, applicable Notices to Airmen (NOTAMS), aviation electronic checklist data, aircraft data, aircraft weight data, aircraft fuel data, timing data, distance data, airport facilities data, emergency services data, aircraft equipment trouble alert, a flight crew configurable reminder, a hold reminder for a waypoint indicating a desire to hold at the waypoint, an airport change notice, special use airspace notice, departure delay notice, or arrival delay notice, legality data, and/or flight plan deviation data from one or more remote servers. The timeline GUI may be configured to display a timeline, waypoint graphical elements representative of the waypoints, course data item graphical elements representative of the other course data items, and notification data item graphical elements representative of upcoming conditions, and wherein when displayed each waypoint graphical element, course data item graphical element and notification data item graphical element may be positioned on the timeline along with the estimated time for the aircraft to reach the graphical element.

In another embodiment, a method in a flight deck system for providing task management assistance in managing the flight path to the flight crew is provided. The method comprises: mining flight plan data for a current flight plan, navigational data, and vertical situation display (VSD) data from one or more aircraft systems; obtaining notification data items originating from onboard avionics systems and from systems external to onboard avionics systems that indicate upcoming conditions that will affect the current flight plan; automatically analyzing the mined flight plan data and the notification data items to identify a sensed deviation condition when a sensed deviation condition exists; automatically identifying an aircraft-related deviation condition from an aircraft failure event when an aircraft failure event exists; receiving flight crew notification of a non-sensed deviation condition when a non-sensed deviation condition exists; automatically determining one or more modifications to the current flight plan to generate a plurality of flight plan deviation options to accommodate a sensed deviation condition, an aircraft-related deviation condition, or a non-sensed deviation condition; and presenting graphical elements representative of the flight plan deviation options to the flight crew on an integrated interactive graphical user interface (GUI) comprising a timeline GUI, a map GUI, and a VSD GUI displayed on an aircraft display.

These aspects and other embodiments may include one or more of the following features. Presenting graphical elements representative of the flight plan deviation options to the flight crew on an integrated interactive graphical user interface (GUI) may comprise causing the display of a selectable deviation notification graphical element on the integrated interactive GUI. The method may further comprise receiving the selection of a selectable deviation notification graphical element, wherein the selection of a selectable deviation notification graphical element causes the display of one or more selectable deviation recommendation graphical elements, each containing graphical data that is descriptive of a flight path deviation recommendation option. The method may further comprise receiving the selection of a selectable deviation recommendation graphical element, wherein receiving the selection of a selectable deviation recommendation graphical element causes a preview of a flight path deviation recommendation option to be displayed on the map GUI and/or the VSD GUI. The method may further comprise submitting a flight path deviation recommendation option selected by the flight crew to ATC for approval. The method may further comprise providing a selectable activate graphical element for flight crew selection that when selected causes a selected flight path deviation recommendation option to be activated.

In another embodiment, non-transient computer readable media encoded with programming instructions is provided. The programming instructions are configurable to cause a processor on an aircraft to: mine flight plan data for a current flight plan, navigational data, and vertical situation display (VSD) data from one or more aircraft systems; obtain notification data items originating from onboard avionics systems and from systems external to onboard avionics systems that indicate upcoming conditions that will affect the current flight plan; automatically analyze the mined flight plan data and the notification data items to identify a sensed deviation condition; automatically identify an aircraft-related deviation condition from an aircraft failure event; receive flight crew notification of a non-sensed deviation condition; automatically determine one or more modifications to the current flight plan to generate a plurality of flight plan deviation options to accommodate a sensed deviation condition, an aircraft-related deviation condition, or a non-sensed deviation condition; and present graphical elements representative of the flight plan deviation options to the flight crew on an integrated interactive graphical user interface (GUI) comprising a timeline GUI, a map GUI, and a VSD GUI displayed on an aircraft display.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck system for providing task management assistance in managing a flight path to a flight crew, the system comprising one or more processors configured by programming instructions on non-transitory computer readable media to:
   cause an integrated interactive graphical user interface (GUI) comprising (a) a timeline GUI that displays a timeline with a time scale, one or more waypoint graphical elements representative of waypoints, one or more course data item graphical elements representative of other course data items, and one or more notification data item graphical elements representative of upcoming conditions when present, (b) a map GUI that presents a birds-eye viewpoint or three-dimensional viewpoint of a portion of a flight plan, and (c) a VSD GUI that presents a vertical viewpoint of a portion of a flight plan to be displayed on an aircraft display;
   mine flight plan data for a current flight plan, navigational data, and vertical situation display (VSD) data from one or more aircraft systems;
   obtain notification data items originating from onboard avionics systems and from systems external to onboard avionics systems that indicate upcoming conditions that will affect the current flight plan;
   automatically analyze the mined flight plan data and the notification data items to identify a sensed deviation condition that requires deviation from the current flight plan;
   automatically identify an aircraft-related deviation condition from an aircraft failure event that requires deviation from the current flight plan;
   receive notification by a flight crew member of a non-sensed deviation condition that requires deviation from the current flight plan;
   when a sensed deviation condition is detected,
      automatically generate a plurality of flight plan deviation options to accommodate the sensed deviation condition, and
      present a selectable deviation notification graphical element on the map GUI when an aircraft-related deviation condition is detected,
      automatically generate a plurality of flight plan deviation options to accommodate the aircraft-related deviation condition, and
      present a selectable deviation notification graphical element on the map GUI; and
   when a non-sensed deviation condition is detected,
      automatically generate a plurality of flight plan deviation options to accommodate the non-sensed deviation condition, and
      present a selectable deviation notification graphical element on the map GUI wherein selection of a selectable deviation notification graphical element causes the display of one or more selectable deviation recommendation graphical elements, each containing graphical data that is descriptive of an automatically generated flight path deviation option, and
   wherein selection of a selectable deviation recommendation graphical element causes a preview of an automatically generated flight path deviation option to be displayed on the map GUI and/or the VSD GUI.

2. The flight deck system of claim 1, wherein:
   a sensed deviation condition comprises a weather condition along or approaching the flight path, an airport closure at a planned destination airport, a runway closure at a planned destination runway, and/or an airspace restriction along the planned flight path that causes a desire for a flight plan deviation;
   the aircraft failure event comprises a hydraulic failure, electrical system failure, engine failure, and/or flight automation failure; and/or
   the non-sensed deviation condition comprises an onboard medical emergency.

3. The flight deck system of claim 1, wherein to automatically generate a plurality of flight plan deviation options the flight deck system is configured to incorporate operational limitations and checklist requirements in deviation planning.

4. The flight deck system of claim 1, further configured to submit a flight path deviation recommendation option selected by the flight crew to ATC for approval.

5. The flight deck system of claim 4, further configured to provide a selectable activate graphical element for flight crew selection that when selected causes a selected flight path deviation recommendation option to be activated.

6. The flight deck system of claim 1, further comprising a flight path deviation processor, the flight path deviation processor comprising one or more processor configured by programming instructions on non-transitory computer readable media, wherein the flight path deviation processor is a rule-based system that compares options for lateral and vertical flight path deviations and presents a computed best options based on current aircraft performance, and wherein the flight path deviation processor is accessible directly from a link on the timeline GUI.

7. The flight deck system of claim 1, wherein the one or more aircraft systems comprises:
   an onboard flight management system (FMS); or
   an electronic flight bag (EFB) application on which the flight plan was created and wherein the flight plan was synced with or loaded into an onboard avionics system (such as, an onboard flight management system (FMS)) from the EFB application.

8. The flight deck system of claim 1, wherein:
the mined flight plan data includes a plurality of waypoints and other course data items for a current flight plan, the other course data items comprising a plurality of a scheduled altitude change, scheduled speed change, a scheduled heading change, and an altitude, speed, or time restriction;
the mined navigational data includes aircraft location, speed, and heading data; and
the mined VSD data includes a vertical profile of the aircraft for the current flight plan, an altitude reference, terrain data, and glideslope data.

9. The flight deck system of claim 1, wherein the notification data items comprises airport data, runway data, navigation data, map data, weather data, ATC alert data, traffic alert data, applicable Notices to Airmen (NOTAMS), aviation electronic checklist data, aircraft data, aircraft weight data, aircraft fuel data, timing data, distance data, airport facilities data, emergency services data, aircraft equipment trouble alert, a flight crew configurable reminder, a hold reminder for a waypoint indicating a desire to hold at the waypoint, an airport change notice, special use airspace notice, departure delay notice, or arrival delay notice, legality data, and/or flight plan deviation data from one or more remote servers.

10. The flight deck system of claim 1, wherein the timeline GUI is configured to display a timeline, waypoint graphical elements representative of the waypoints, course data item graphical elements representative of the other course data items, and notification data item graphical elements representative of upcoming conditions, and wherein when displayed each waypoint graphical element, course data item graphical element and notification data item graphical element is positioned on the timeline along with an estimated time for the aircraft to reach the graphical element.

11. A method in a flight deck system for providing task management assistance in managing a flight path to a flight crew, the method comprising:
displaying an integrated interactive graphical user interface (GUI) comprising (a) a timeline GUI that displays a timeline with a time scale, one or more waypoint graphical elements representative of waypoints, one or more course data item graphical elements representative of other course data items, and one or more notification data item graphical elements representative of upcoming conditions when present, (b) a map GUI that presents a birds-eye viewpoint or three-dimensional viewpoint of a portion of a flight plan, and (c) a VSD GUI that presents a vertical viewpoint of a portion of a flight plan on an aircraft display;
mining flight plan data for a current flight plan, navigational data, and vertical situation display (VSD) data from one or more aircraft systems;
obtaining notification data items originating from onboard avionics systems and from systems external to onboard avionics systems that indicate upcoming conditions that will affect the current flight plan;
automatically analyzing the mined flight plan data and the notification data items to identify a sensed deviation condition that requires deviation from the current flight plan when a sensed deviation condition exists;
automatically identifying an aircraft-related deviation condition from an aircraft failure event that requires deviation from the current flight plan when an aircraft failure event exists;
receiving flight crew notification of a non-sensed deviation condition that requires deviation from the current flight plan when a non-sensed deviation condition exists;
when a sensed deviation condition is detected,
automatically generating a plurality of flight plan deviation options to accommodate the sensed deviation condition, and
presenting a selectable deviation notification graphical element on the map GUI;
when an aircraft-related deviation condition is detected,
automatically generating a plurality of flight plan deviation options to accommodate the aircraft-related deviation condition, and
presenting a selectable deviation notification graphical element on the map GUI; and
when a flight plan deviation condition is detected,
automatically generating a plurality of flight plan deviation options to accommodate the non-sensed deviation condition, and
presenting a selectable deviation notification graphical element on the map GUI wherein selection of a selectable deviation notification graphical element causes the display of one or more selectable deviation recommendation graphical elements, each containing graphical data that is descriptive of an automatically generated flight path deviation option, and
wherein selection of a selectable deviation recommendation graphical element causes a preview of an automatically generated flight path deviation option to be displayed on the map GUI and/or the VSD GUI.

12. The method of claim 11, further comprising submitting a flight path deviation recommendation option selected by the flight crew to ATC for approval.

13. The method of claim 12, further comprising providing a selectable activate graphical element for flight crew selection that when selected causes a selected flight path deviation recommendation option to be activated.

14. Non-transitory computer readable media encoded with programming instructions configurable to cause one or more processors on an aircraft to:
cause an integrated interactive graphical user interface (GUI) comprising (a) a timeline GUI that displays a timeline with a time scale, one or more waypoint graphical elements representative of waypoints, one or more course data item graphical elements representative of other course data items, and one or more notification data item graphical elements representative of upcoming conditions when present, (b) a map GUI that presents a birds-eye viewpoint or three-dimensional viewpoint of a portion of a flight plan, and (c) a VSD GUI that presents a vertical viewpoint of a portion of a flight plan to be displayed on an aircraft display;
mine flight plan data from a current flight plan, navigational data, and vertical situation display (VSD) data from one or more aircraft systems;
obtain notification data items originating from onboard avionics systems and from systems external to onboard avionics systems that indicate upcoming conditions that will affect the aircraft flight plan;
automatically analyze the mined flight plan data and the notification data items to identify a sensed deviation condition that requires deviation from the current flight plan;
automatically identify an aircraft-related deviation condition from an aircraft failure event that requires deviation from the current flight plan;

receive flight crew notification of a non-sensed deviation condition that requires deviation from the current flight plan;

when a sensed deviation condition is detected,
   automatically generate a plurality of flight plan deviation options to accommodate the sensed deviation condition, and
   present a selectable deviation notification graphical element on the map GUI;

when an aircraft-related deviation condition is detected,
   automatically generate a plurality of flight plan deviation options to accommodate the aircraft-related deviation condition, and
   present a selectable deviation notification graphical element on the map GUI; and when a non-sensed deviation condition is detected,
   automatically generate a plurality of flight plan deviation options to accommodate the non-sensed deviation condition, and
   present a selectable deviation notification graphical element on the map GUI wherein selection of a selectable deviation notification graphical element causes the display of one or more selectable deviation recommendation graphical elements, each containing graphical data that is descriptive of an automatically generated flight path deviation option, and wherein selection of a selectable deviation recommendation graphical element causes a preview of an automatically generated flight path deviation option to be displayed on the map GUI and/or the VSD GUI.

15. The method of claim 11, wherein:
a sensed deviation condition comprises a weather condition along or approaching the flight path, an airport closure at a planned destination airport, a runway closure at a planned destination runway, and/or an airspace restriction along the planned flight path that causes a desire for a flight plan deviation; and
the non-sensed deviation condition comprises an onboard medical emergency.

16. The method of claim 11, wherein automatically generating a plurality of flight plan deviation options comprises incorporating operational limitations and checklist requirements in deviation planning.

17. The method of claim 11, further comprising providing a flight path deviation processor, the flight path deviation processor comprising one or more processors configured by programming instructions on non-transitory computer readable media, wherein the flight path deviation processor is a rule-based system that compares options for lateral and vertical flight path deviations and presents a computed best options based on current aircraft performance, and wherein the flight path deviation processor is accessible directly from a link on the timeline GUI.

18. The method of claim 11, wherein the one or more aircraft systems comprises:
an onboard flight management system (FMS); or
an electronic flight bag (EFB) application on which the flight plan was created and wherein the flight plan was synced with or loaded into an onboard avionics system from the EFB application.

19. The method of claim 11, wherein:
the mined flight plan data includes a plurality of waypoints and other course data items for a current flight plan, the other course data items comprising a plurality of a scheduled altitude change, scheduled speed change, a scheduled heading change, and an altitude, speed, or time restriction;
the mined navigational data includes aircraft location, speed, and heading data; and
the mined VSD data includes a vertical profile of the aircraft for the current flight plan, an altitude reference, terrain data, and glideslope data.

20. The method of claim 11, wherein the notification data items comprises one or more of airport data, runway data, navigation data, map data, weather data, ATC alert data, traffic alert data, applicable Notices to Airmen (NOTAMS), aviation electronic checklist data, aircraft data, aircraft weight data, aircraft fuel data, timing data, distance data, airport facilities data, emergency services data, aircraft equipment trouble alert, a flight crew configurable reminder, a hold reminder for a waypoint indicating a desire to hold at the waypoint, an airport change notice, special use airspace notice, departure delay notice, arrival delay notice, legality data, and/or flight plan deviation data from one or more remote servers.

* * * * *